US008152628B2

(12) United States Patent
Kinsley et al.

(10) Patent No.: US 8,152,628 B2
(45) Date of Patent: Apr. 10, 2012

(54) METHODS AND DEVICES FOR AUTHENTICATION AND LICENSING IN A GAMING NETWORK

(75) Inventors: Michael Kinsley, Reno, NV (US); Steven LeMay, Reno, NV (US); Lance Orner, Sparks, NV (US)

(73) Assignee: IGT, Reno, NV (US)

( * ) Notice: Subject to any disclaimer, the term of this patent is extended or adjusted under 35 U.S.C. 154(b) by 1537 days.

(21) Appl. No.: 11/225,408

(22) Filed: Sep. 12, 2005

(65) Prior Publication Data
US 2007/0026942 A1 Feb. 1, 2007

Related U.S. Application Data

(60) Provisional application No. 60/704,634, filed on Aug. 1, 2005.

(51) Int. Cl.
*A63F 9/24* (2006.01)
(52) U.S. Cl. ......................................................... 463/25
(58) Field of Classification Search .................. 463/29
See application file for complete search history.

(56) References Cited

U.S. PATENT DOCUMENTS

| 5,326,104 | A | 7/1994 | Pease et al. | |
|---|---|---|---|---|
| 6,254,483 | B1 | 7/2001 | Acres | |
| 6,264,560 | B1 * | 7/2001 | Goldberg et al. | 463/42 |
| 6,319,125 | B1 | 11/2001 | Acres | |
| 6,356,794 | B1 | 3/2002 | Perin et al. | |
| 6,502,079 | B1 * | 12/2002 | Ball et al. | 705/59 |
| 6,817,948 | B2 | 11/2004 | Pascal et al. | |
| 6,923,720 | B2 | 8/2005 | Loose | |
| 7,103,663 | B2 * | 9/2006 | Inoue et al. | 709/225 |
| 7,127,069 | B2 * | 10/2006 | Nguyen | 380/278 |
| 7,430,754 | B2 * | 9/2008 | Speare et al. | 726/1 |
| 7,464,058 | B2 * | 12/2008 | Yen et al. | 705/59 |
| 7,515,718 | B2 * | 4/2009 | Nguyen et al. | 380/278 |
| 7,555,126 | B2 * | 6/2009 | Okada et al. | 380/251 |
| 2002/0001307 | A1 | 1/2002 | Nguyen et al. | |
| 2002/0013772 | A1 | 1/2002 | Peinado | |
| 2002/0071557 | A1 * | 6/2002 | Nguyen | 380/251 |

(Continued)

FOREIGN PATENT DOCUMENTS

CN 101233546 7/2008
(Continued)

OTHER PUBLICATIONS

International Search Report, mailed Nov. 22, 2006, from related International Application No. PCT/US2006/029625, including Notification of Transmittal, 5 pp.

(Continued)

*Primary Examiner* — Omkar Deodhar
(74) *Attorney, Agent, or Firm* — Weaver Austin Villeneuve & Sampson LLP

(57) ABSTRACT

Methods and devices are provided for managing licenses in gaming networks. Some aspects of the invention are provided as a license manager module that operates as part of a server-based system for provisioning and configuring gaming machines. Security and authentication techniques are provided to prevent unauthorized gaming software usage. Such gaming software may be, for example, downloaded to gaming machines in the network under the control of a gaming establishment's game management server that is in communication with a license manager device. In preferred implementations, a gaming machine is prevented from executing software for a game of chance unless the license for that game is valid and has not expired.

11 Claims, 16 Drawing Sheets

(Permission)

U.S. PATENT DOCUMENTS

| | | | |
|---|---|---|---|
| 2002/0080174 A1 | 6/2002 | Kodosky et al. | |
| 2002/0085720 A1* | 7/2002 | Okada et al. | 380/251 |
| 2002/0116615 A1 | 8/2002 | Nguyen et al. | |
| 2003/0005135 A1* | 1/2003 | Inoue et al. | 709/229 |
| 2003/0176218 A1 | 9/2003 | LeMay et al. | |
| 2004/0098348 A1 | 5/2004 | Kawasaki | |
| 2004/0132531 A1 | 7/2004 | George et al. | |
| 2004/0230683 A1* | 11/2004 | Adamczyk et al. | 709/227 |
| 2004/0248642 A1 | 12/2004 | Rothschild | |
| 2005/0038753 A1* | 2/2005 | Yen et al. | 705/59 |
| 2005/0054431 A1 | 3/2005 | Walker et al. | |
| 2005/0119977 A1* | 6/2005 | Raciborski | 705/59 |
| 2005/0153778 A1 | 7/2005 | Nelson et al. | |
| 2005/0170892 A1 | 8/2005 | Atkinson | |
| 2005/0192099 A1* | 9/2005 | Nguyen et al. | 463/42 |
| 2006/0059421 A1 | 3/2006 | Benbrahim et al. | |
| 2006/0258428 A1 | 11/2006 | Blackburn et al. | |
| 2006/0264256 A1 | 11/2006 | Gagner et al. | |
| 2007/0004506 A1 | 1/2007 | Kinsley et al. | |
| 2007/0026935 A1 | 2/2007 | Wolf et al. | |
| 2007/0032285 A1 | 2/2007 | Wolf et al. | |
| 2007/0060363 A1 | 3/2007 | Nguyen et al. | |

FOREIGN PATENT DOCUMENTS

| | | |
|---|---|---|
| CN | 101238493 | 8/2008 |
| CN | 101783047 | 7/2010 |
| EP | 1 363 252 A2 | 11/2003 |
| EP | 1920414 | 5/2008 |
| EP | 1934960 | 6/2008 |
| GB | 2 042 234 A | 9/1980 |
| WO | 2007/016402 | 2/2007 |
| WO | 2007/016439 | 2/2007 |

OTHER PUBLICATIONS

Written Opinion of the International Searching Authority, mailed Nov. 22, 2006, from related International Application No. PCT/US2006/029625, 6 pp.

International Search Report mailed Jan. 24, 2007, from related International Patent Application No. PCT/US2006/029550, including Notification of Transmittal. 5 pp.

Written Opinion of the International Searching Authority mailed Jan. 24, 2007, from related International Patent Application No. PCT/US2006/029550, 5 pp.

Kohno et al., "*Remote Physical Device Fingerprinting*", http://www.caida.org/outreach/papers/2005/fingerprinting/index.xml, Presented at the IEEE Symposium on Security and Privacy, May 8-11, 2005, 15 pages.

US Office Action Dec. 9, 2009 from U.S. Appl. No. 11/225,407.

US Restriction Requirement dated Sep. 3, 2009 from U.S. Appl. No. 11/225,407.

China Office Action dated Oct. 30, 2009 from CN Application No. 200680028131.4.

China Office Action dated Jun. 26, 2009 from Chinese Application No. 200680028398.3.

European Examination Report dated Sep. 8, 2008 from EP Application No. 6788873.5.

US Examiner Interview Summary dated May 12, 2011, from U.S. Appl. No. 11/225,407.

US Final Office Action dated Mar. 10, 2011, from U.S. Appl. No. 11/225,407.

Australian Office Action dated Oct. 29, 2010, from Application No. 2006275655.

Australian Office Action dated Dec. 16, 2010, from Application No. 2006275603.

Mexican Official Action dated Mar. 18, 2011, issued in Patent App No. 2008/001566.

Chinese Office Action dated Apr. 13, 2011, from Application No. 200910173886.9.

Chinese Notification to Make Divisional Application dated Jul. 3, 2009, from Application No. 200680028131.4.

Chinese Office Action dated Feb. 5, 2010, from Application No. 200680028398.3.

US Final Office Action dated May 3, 2010, from U.S. Appl. No. 11/225,407.

International Preliminary Report on Patentability dated Feb. 5, 2008, from Application No. PCT/US2006/029625.

International Preliminary Report on Patentability dated Feb. 5, 2008, from Application No. PCT/US2006/029550.

US Office Action dated Oct. 5, 2010, from U.S. Appl. No. 11/225,407.

Chinese Office Action dated Sep. 1, 2010, from Application No. 200680028131.4.

* cited by examiner

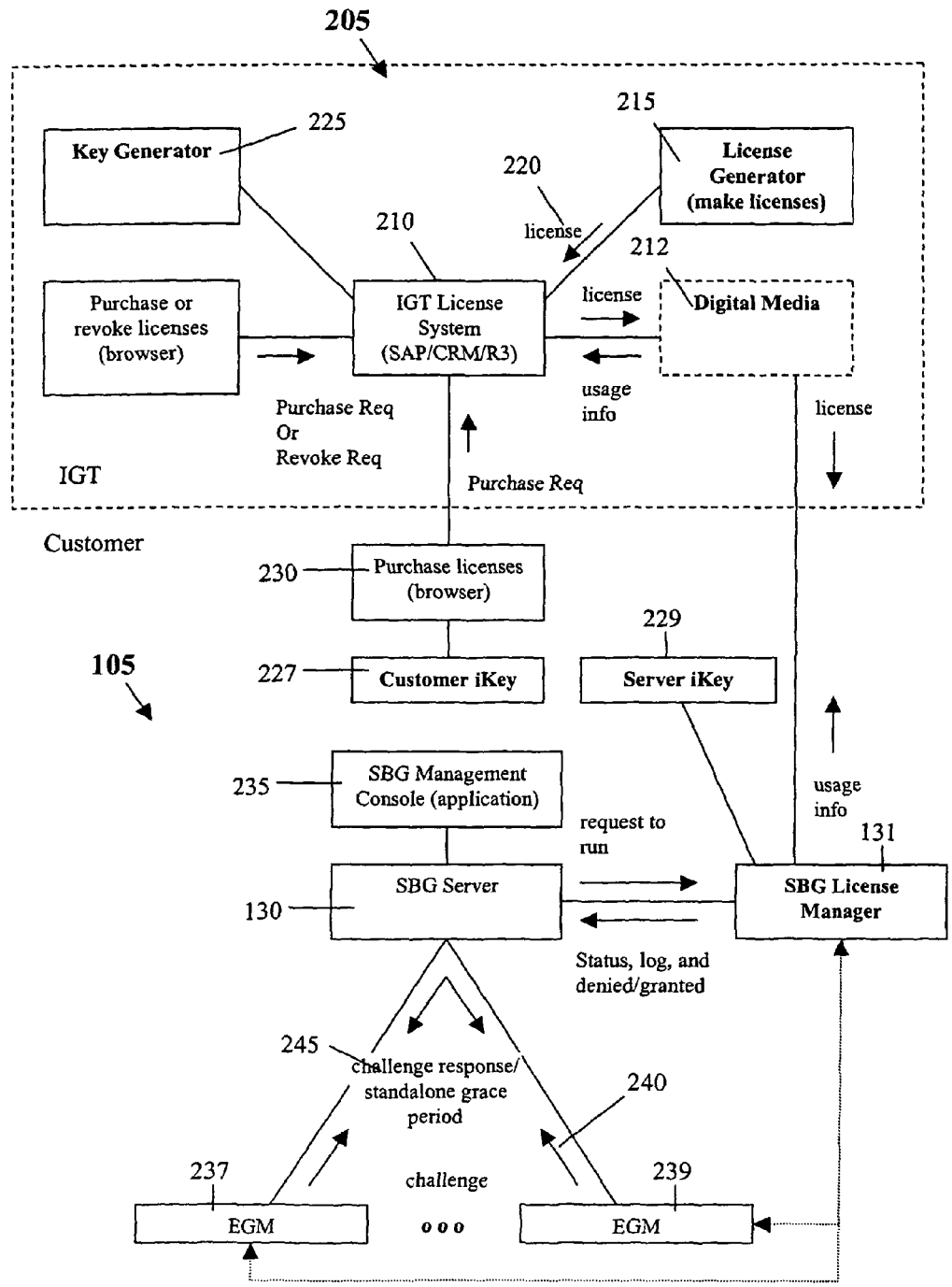
Fig. 2 (LM Components and Flow)

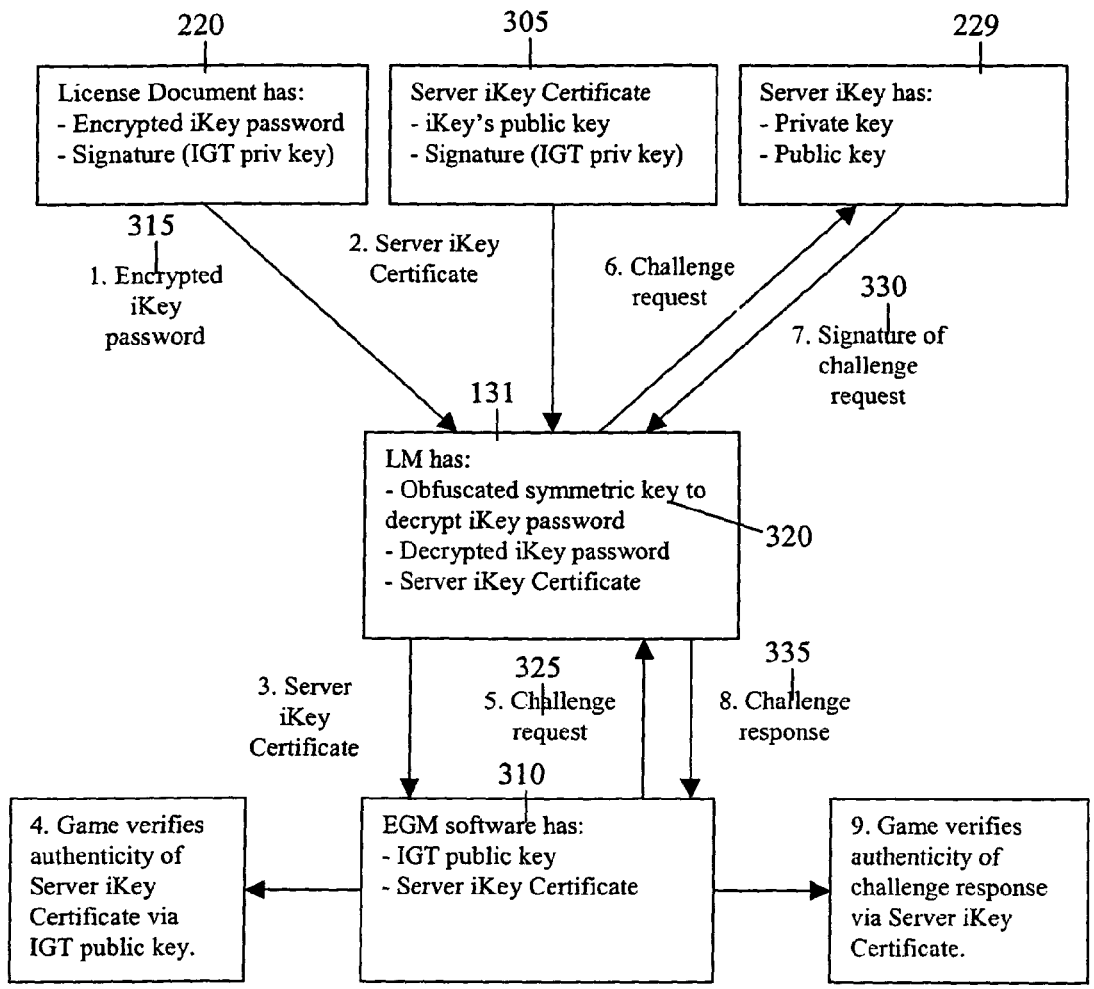
Fig. 3 (Runtime Operations)

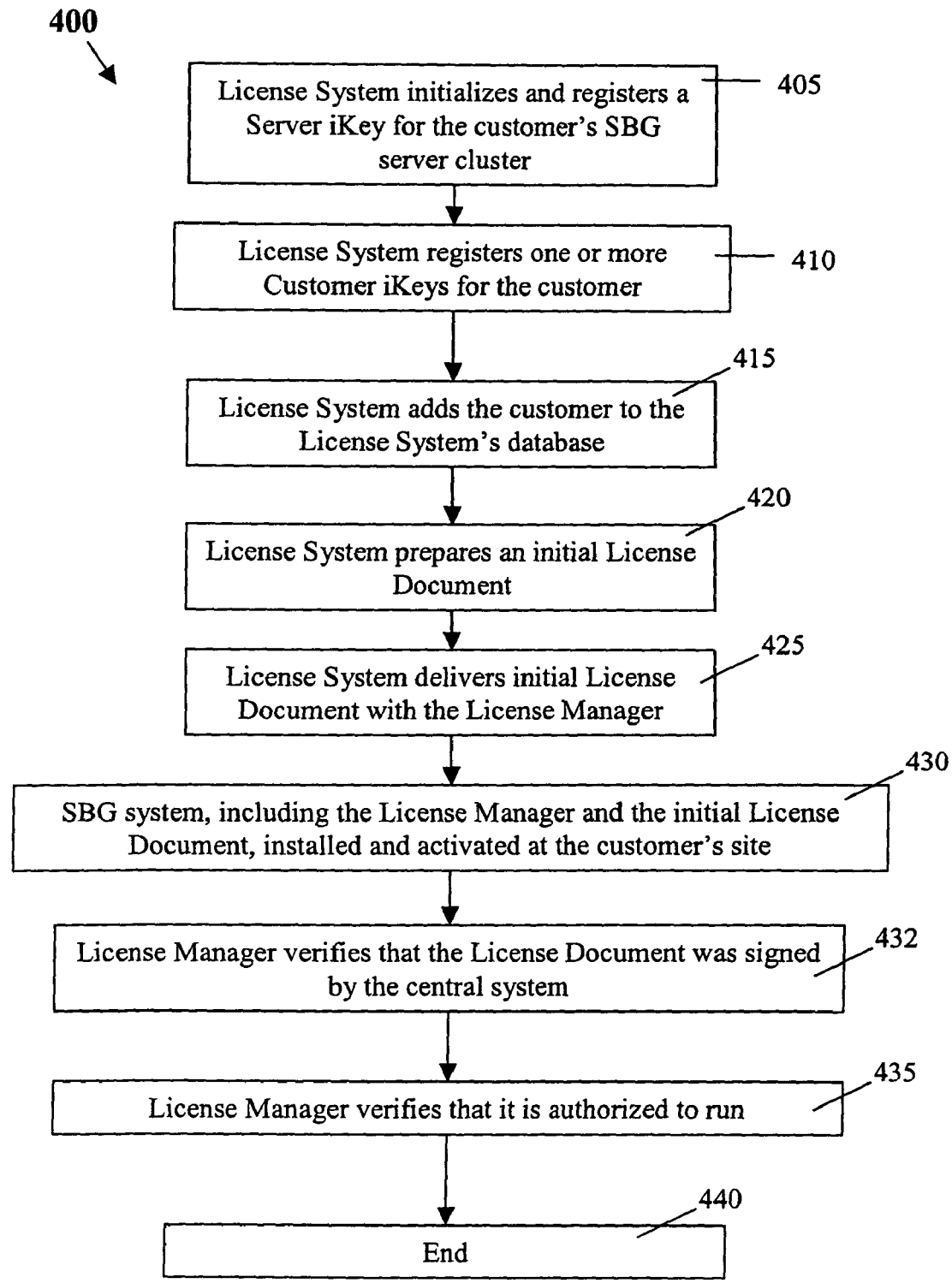
Fig. 4 (Enroll)

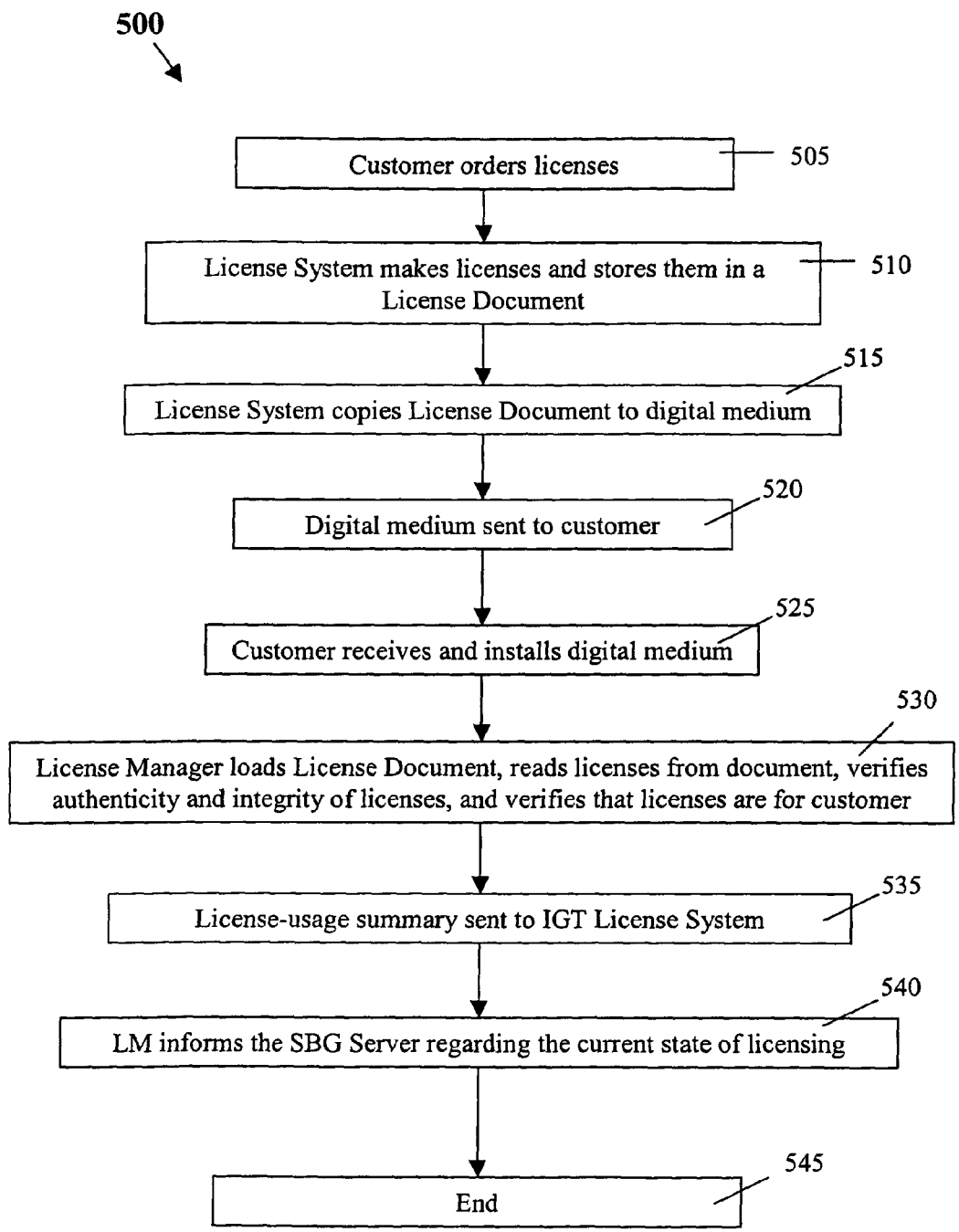
Fig. 5 (Order Licenses)

(Permission)

Fig. 7 (Convert Permission)

Fig. 8 (Update Grace Period)

Fig. 9 (Continue Permission)

Fig. 10 (License Expires)

Fig. 11 (License Document Expires)

METHODS AND DEVICES FOR AUTHENTICATION AND LICENSING IN A GAMING NETWORK

CROSS-REFERENCE TO RELATED APPLICATIONS

This application claims priority to U.S. Provisional Patent Application No. 60/704,634 entitled "SERVER BASED GAMING" and filed Aug. 1, 2005 by Wolf et al., which is incorporated herein by reference in its entirety and for all purposes. This application is related to U.S. patent application Ser. No. 11/225,407, by Wolf et al., entitled "METHODS AND DEVICES FOR MANAGING GAMING NETWORKS" and filed concurrently with this application, which is also incorporated herein by reference in its entirety and for all purposes.

BACKGROUND OF THE INVENTION

This invention relates to networks of gaming machines, such as slot machines and video poker machines. More particularly, the present invention relates to methods and devices for managing and provisioning gaming machines and other devices in a gaming network.

The gaming machines under the control of a particular entity may be globally distributed in many different types of establishments. Casinos, convenience stores, supermarkets, bars and boats are a few examples of establishments where gaming machines may be placed.

Typically, utilizing a master gaming controller, a gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

The operations described above may be carried out on the gaming machine when the gaming machine is operating as a "stand alone" unit or linked in a network of some type to a group of gaming machines. As technology in the gaming industry progresses, more and more gaming services are being provided to gaming machines via communication networks that link groups of gaming machines to a networked computer (which may be a local or a remote computer) that provides one or more gaming services. As an example, gaming services that may be provided by a networked computer to a gaming machine via a communication network of some type include player tracking, accounting, cashless award ticketing, lottery, progressive games and bonus games.

Typically, network gaming services enhance the game playing capabilities of the gaming machine or provide some operational advantage in regards to maintaining the gaming machine. Thus, network gaming services provided to groups of gaming machines linked over a dedicated communication network of some type have become very popular in the gaming industry. In general, the dedicated communication network is not accessible to the public. To justify the costs associated with the infrastructure needed to provide network gaming services on a dedicated communication network, a certain critical number of gaming machines linked in a network of some type must utilize the service. Thus, many of the network gaming services are only provided at larger gaming establishments where a large number of gaming machines are deployed.

One example wherein a group of gaming machines are linked using a dedicated network to provide a network gaming service is a progressive game network. The progressive game services enabled by the progressive game network increase the game playing capabilities of a particular gaming machine by enabling a larger jackpot than would be possible if the gaming machine was operating in a "stand alone" mode. The potential size of the jackpot increases as the number gaming machines connected in the progressive network is increased. The size of the jackpot tends to increase game play on gaming machines offering a progressive jackpot, which justifies the costs associated with installing and maintaining the dedicated progressive game network.

However, there are many aspects of managing and provisioning gaming machines that are still performed manually. For example, in a time consuming process, installing a new game has previously involved manually exchanging an EPROM (e.g. a read-only memory) containing the game on the gaming machine. The software is manually loaded because the gaming software is very highly regulated and in most gaming jurisdictions only approved gaming software may be installed on a gaming machine. Further, the gaming software is manually loaded for security reasons, in order to prevent the gaming software from being obtained by individuals who might use the gaming software to try to find ways of cheating the gaming machine. Other attributes of gaming machines, such as the denomination, pay tables, etc., are also manually configured for similar reasons.

Methods and devices for downloading gaming software for games of chance have been proposed. However, downloading such gaming software presents a number of challenges. For example, hackers could potentially make and distribute unauthorized copies of the gaming software. Even if gaming software were distributed only to authorized customers, it would be difficult to ensure that the subsequent use of this software would be in compliance with the corresponding license agreements.

It would be desirable to provide methods and devices that overcome at least some of these drawbacks of the prior art.

SUMMARY OF THE INVENTION

Methods and devices are provided for managing licenses in gaming networks. Some aspects of the invention are provided as a license manager module that operates as part of a server-based system for provisioning and configuring gaming machines. Security and authentication techniques are provided to prevent unauthorized gaming software usage. Such gaming software may be, for example, downloaded to gaming machines in the network under the control of a gaming establishment's game management server that is in communication with a license manager device. In preferred implementations, a gaming machine is prevented from executing software for a game of chance unless the license for that game is valid and has not expired.

Some aspects of the invention provide a method of managing licenses for games of chance. The method includes these steps: receiving a request from a customer for at least one license for a game of chance; initializing a server authentication token for a license manager device; registering the server authentication token for the license manager device;

initializing a license ordering authentication token; registering the license ordering authentication token; preparing a license document, the license document comprising information indicating licenses provided to the customer, a server authentication token ID and an encrypted server authentication token password; configuring license management software with instructions for controlling a license manager device to retrieve and decrypt the encrypted server authentication token password; and providing the server authentication token, the license ordering authentication token, the license document and the license management software to the customer.

The method may also include the steps of using a private key to sign the license document and including a signature in the license document. The license document may include license expiration dates for licenses provided to the customer. The license document may include a license document expiration date that supercedes all expiration dates for licenses provided to the customer. The license document may include a standalone grace period that specifies how long a gaming machine may be configured to execute a game of chance without receiving further permission.

The method may include these steps: including a public key, a server authentication token certificate, licensing information, challenge request instructions and challenge response instructions with gaming software for the game of chance; and providing the gaming software to the customer. The step of providing the gaming software to the customer may involve downloading the gaming software from a central server to a customer's gaming management server. The method may include these steps: loading the gaming machine software on a gaming machine; coupling the server authentication token with the license manager device; and loading the license management software on the license manager device. The method may include the steps of forming a challenge request according to the challenge request instructions and sending the challenge request from the gaming machine to the license manager device.

The license manager software may be provided with an obfuscated symmetric key to decrypt the encrypted server authentication token password in the license document. The license manager software may include instructions for authenticating the license document according to the signature in the license document. The server authentication token password may be encrypted using a symmetric key.

In some implementations, the license manager device is a license management server. In some such implementations, the method may also include these steps: coupling the server authentication token with the license management server; and loading the license management software on the license management server.

The license manager may be further configured to periodically cause a gaming machine's standalone grace period to be reset. If so, the method may include the step of determining whether to grant permission for the gaming machine to continue being configured to execute a game of chance. The method may include the steps of forming a challenge request according to the challenge request instructions and sending the challenge request from the gaming machine to the license manager device. In some such implementations, the license manager device receives the challenge request, signs the challenge request using the server authentication token and returns a signed challenge request to the gaming machine as a challenge response. The gaming machine can receive the challenge response and determine the authenticity of the challenge response via the server authentication token certificate.

When it is determined to grant permission, the method may include the step of causing a permission granted configuration message with a non-zero standalone grace period to be sent to the gaming machine. The permission granted configuration message causes the gaming machine to reset a grace period timer according to the non-zero standalone grace period and to continue being configured to execute the game of chance.

When it is determined not to grant permission, the method may include the step of causing a permission denied configuration message with a zero standalone grace period to be sent to the gaming machine. The permission denied configuration message causes the gaming machine to stop being configured to execute the game of chance.

Alternative implementations of the invention provide a licensing management method for gaming. The method includes these steps: receiving a request for a first permission to execute a game of chance on a gaming machine; determining that a corresponding license is available and not expired; granting permission to execute the game of chance; and specifying a grace period during which a gaming machine may be configured to execute the game of chance without receiving a second permission to execute the game of chance.

The method may involve sending a configuration message to the gaming machine specifying the grace period. The configuration message includes information to enable the gaming machine to be configured to execute the game of chance. The method may involve setting a grace period timer of the gaming machine.

The request may, for example, be received from a gaming management server. The request and the first permission may pertain to a specific gaming machine. If so, the method may involve associating the specific gaming machine with the corresponding license. Preferably, the method involves informing the gaming management server of a new state of license usage.

The present invention provides other hardware (such as network devices and components of network devices) that is configured to perform the methods of the invention, as well as software to control devices to perform these methods.

These and other features of the present invention will be presented in more detail in the following detailed description of the invention and the associated figures.

BRIEF DESCRIPTION OF THE DRAWINGS

FIG. 2 is a block diagram that illustrates some aspects of the invention.

FIG. 3 is a block diagram that illustrates some aspects of the invention.

FIG. 4 is a flow chart that outlines a method according to some aspects of the invention.

FIG. 5 is a flow chart that outlines a method according to some aspects of the invention.

DESCRIPTION OF PREFERRED EMBODIMENTS

Figure 1:
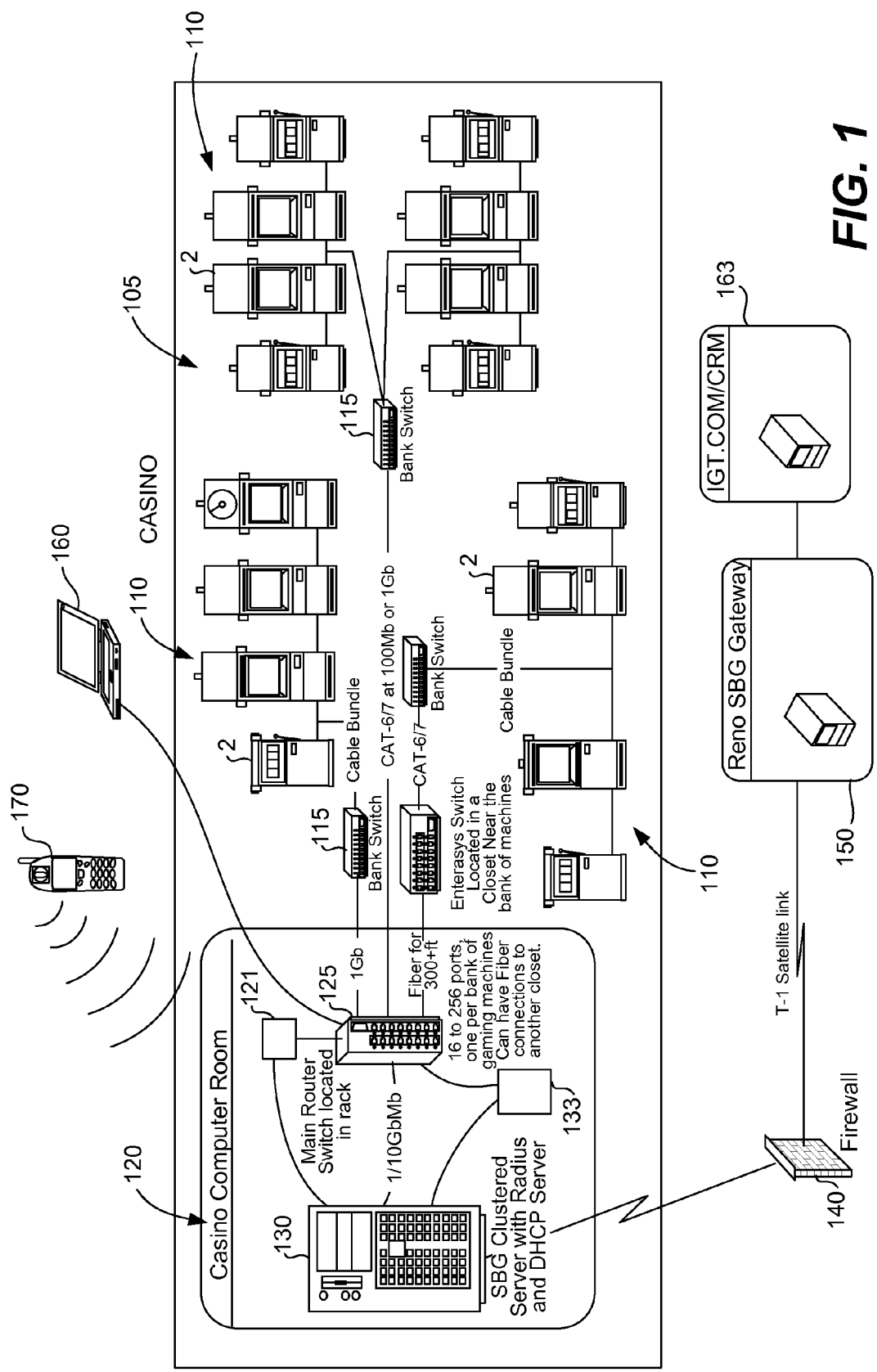
FIG. 1 illustrates one example of a network topology for implementing some aspects of the present invention.

The present application is particularly relevant to game licensing and related security, authentication and game downloading issues. Many aspects of the present invention are implemented, at least in part, by one or more servers. Accordingly, some embodiments of the present invention may be referenced herein as a server-based gaming system or simply as "SBG" or the like.

U.S. patent application Ser. No. 11/225,407, by Wolf et al., entitled "METHODS AND DEVICES FOR MANAGING GAMING NETWORKS," which has been incorporated herein by reference, describes various novel methods and devices for server-based gaming that may be used in connection with the present invention.

As described therein, a server (or server cluster) sometimes referred to as an SBG server, is configured to perform tasks that include gaming machine management, task scheduling, game set management, device management, user management, data collection, log viewing and report viewing. Some implementations of the SBG server are configured to run download manager software that allows, e.g., for the addition of new game binaries into a local repository. Some implementations of the download manager allow a user to manage game downloads to gaming machines in a gaming network.

However, it will be appreciated that many aspects of the present invention may be used in connection with other methods and devices for game downloading, gaming network management and the like. Relevant methods and devices are described in U.S. patent application Ser. No. 11/078,966 by Nguyen et al., entitled "SECURED VIRTUAL NETWORK IN A GAMING ENVIRONMENT" and filed on Mar. 10, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled ": METHODS AND DEVICES FOR DOWNLOADING GAMES OF CHANCE," all of which are hereby incorporated by reference in their entirety and for all purposes.

The present invention provides features that include, but are not limited to, the ability to identify requestors on a network reliably, to authenticate a license document, to determine whether a game license is valid and/or current, to prevent a gaming machine from executing gaming software if a corresponding game license is not valid and/or current, etc. Preferred implementations of the invention are described in detail below.

Alternatively, or additionally, every gaming machine or other device that will be in communication with a gaming establishment (and/or any device that will be in communication with a central system on behalf of a gaming establishment) may be "fingerprinted" according to special characteristics of the machine, and/or according to techniques such as those discussed in patent application Ser. No. 11/078,966, referenced above. Communications from untrusted sources will preferably cause special handling. For example, some implementations provide some level of security notification if an untrusted source cannot be authenticated in response to a challenge.

When, for example, a local server of a gaming establishment requests a game download from a central game repository, a fingerprint of the local server may be obtained and compared with that of a stored fingerprint for that device. If the fingerprint does not match, the central game repository will not download the requested game.

Some such fingerprinting techniques involve the exploitation of small deviations in processor clock skews. Some relevant techniques are discussed, for example, in Kohno, Tadayoshi, "Remote Physical Device Fingerprinting" (IEEE Symposium on Security and Privacy [May 2005]), which is hereby incorporated by reference for all purposes.

Such clock skew deviations are approximately constant over time for each device, but the clock skew of a particular machine will be different from that of another machine. Most Transmission Control Protocol ("TCP") stacks implement the TCP timestamps option of Request for Comment ("RFC") 1323. According to this option, each party in a TCP flow includes information about its perception of time in each outgoing packet. Information contained in the TCP headers can be used to estimate a device's clock skew, thereby allowing the device to be identified. Such identification techniques do not require any modification to the fingerprinted devices. Moreover, such techniques can report consistent measurements when the measurer is thousands of miles, multiple hops, and tens of milliseconds away from the fingerprinted device, even when the fingerprinted device is connected to the Internet from different locations and via different access technologies.

Some such techniques provide reliable fingerprinting even when the fingerprinted device is behind a NAT or firewall and whether the device's system time is maintained via NTP or SNTP. These techniques can also determine whether two devices on the Internet, possibly shifted in time or IP addresses, are actually the same physical device.

Exemplary System Architecture

One example of a network topology for implementing some aspects of the present invention is shown in FIG. 1. Those of skill in the art will realize that this exemplary architecture and the related functionality are merely examples and that the present invention encompasses many other such embodiments and methods. Here, for example, a single gaming establishment 105 is illustrated, which is a casino in this example. However, it should be understood that some implementations of the present invention involve multiple gaming establishments.

Gaming establishment 105 includes 16 gaming machines 2, each of which is part of a bank 110 of gaming machines 2. It will be appreciated that many gaming establishments include hundreds or even thousands of gaming machines 2, not all of which are included in a bank 110. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 125, which combines switching and routing functionality in this example) and/or the inclusion of other network devices not shown in FIG. 1. For example, some implementations of the invention include one or more middleware servers disposed between gaming machines 2 and server 130. Such middleware servers can provide various useful functions, including but not limited to the filtering and/or aggregation of data received from bank switches 115, from individual gaming machines and from other player terminals. Some implementations of the invention include load balancing methods and devices for managing network traffic.

Each bank 110 has a corresponding bank switch 115, which may be a conventional bank switch. Each bank switch is connected to SBG server 130 via main network device 125, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 130, License Manager 131, Arbiter 133 and main network device 125 are disposed within computer room 120 of gaming establishment 105. License Manager 131 may be implemented, at least in part, via a server or a similar device. SBG server 130 can be configured to implement, at least in part, various aspects of the present invention. Some preferred embodiments of SBG server 130 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 131 and main network device 125) are mounted in a single rack with SBG server 130. Accordingly, many or all such devices will sometimes be referenced in the aggregate as an "SBG server." However, in alternative implementations, one or more of these devices is in communication with SBG server 130 but located elsewhere. For example, some of the devices could be mounted in separate racks within computer room 120 or located elsewhere on the network. For example, it can be advantageous to store large volumes of data elsewhere via a storage area network ("SAN").

In some embodiments, these components are SBG server 130 preferably has an uninterruptible power supply ("UPS"). The UPS may be, for example, a rack-mounted UPS module.

Computer room 120 may include one or more operator consoles or other host devices that are configured for communication with SBG server 130. Such host devices may be provided with software, hardware and/or firmware for implementing various aspects of the invention; many of these aspects involve controlling SBG server 130. However, such host devices need not be located within computer room 120. Wired host device 160 (which is a laptop computer in this example) and wireless host device (which is a PDA in this example) may be located elsewhere in gaming establishment 105 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948, 387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 1A:
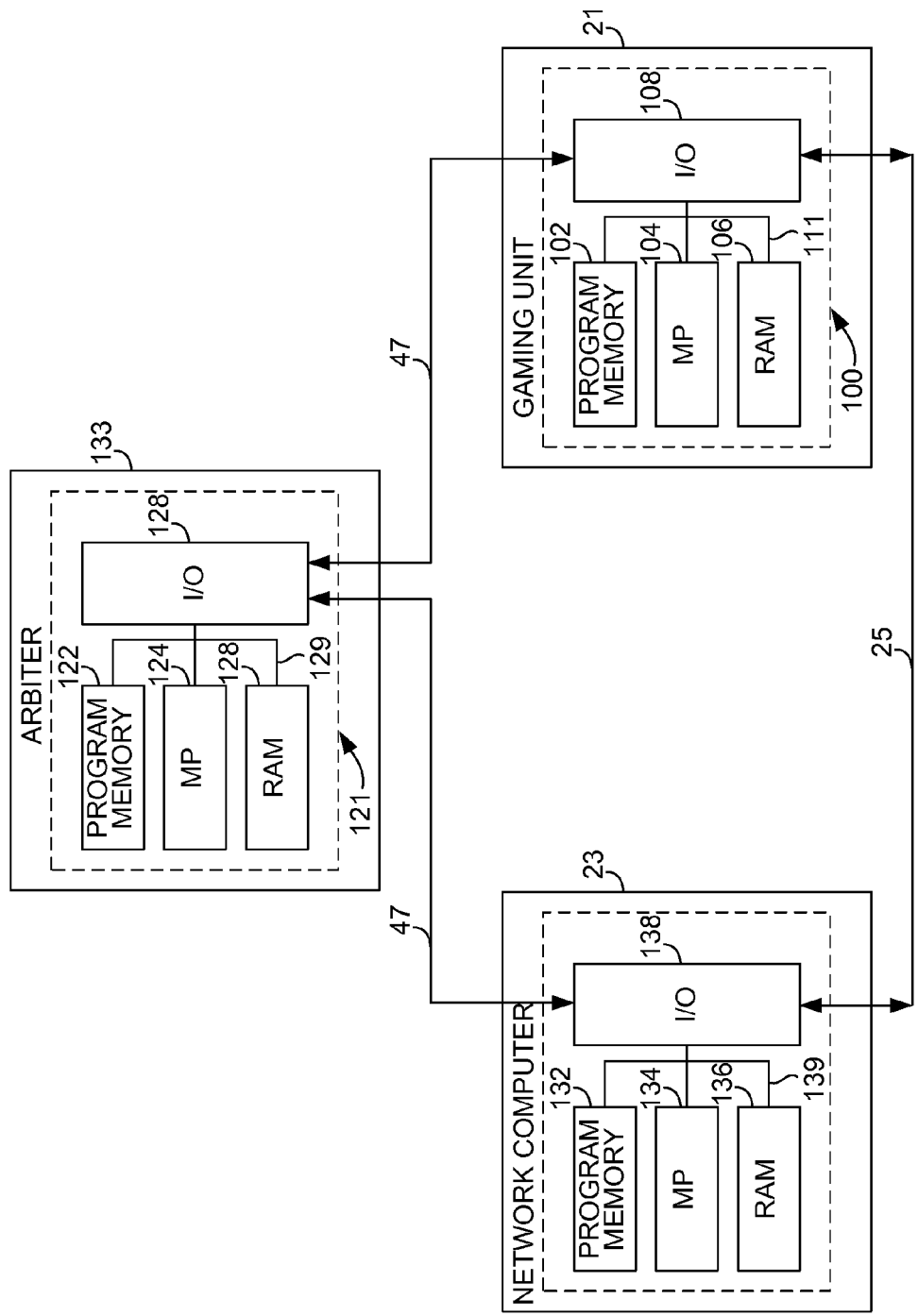
FIG. 1A is a block diagram that illustrates a simplified network topology that illustrates some implementations of an Arbiter.

As shown in FIG. 1A, a gaming unit 21 may be operatively coupled to a network computer 23 (such as SBG server 130 of FIG. 1) via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity, resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each networked gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for implementing some aspects of the invention. Such wireless devices could include, but are not limited to, laptops, PDAs or even cellular telephones. Referring once again to FIG. 1, it should be noted that one or more network devices in gaming establishment 105 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 105 and the outside world should only be made with trusted devices via a secure link, e.g., via a virtual private network ("VPN") tunnel. For example, the illustrated connection between SBG 130, gateway 150 and central system 163 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be found from the VPN Consortium, an industry trade group (http://www.vpnc.org, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10, 000 faster than asymmetric encryption algorithms.

Providing a secure connection between the local devices of the SBG system and IGT's central system allows for the deployment of many advantageous features. For example, a customer (e.g., an employee of a gaming establishment) can log onto an account of central system 163 (in this example, IGT.com) to obtain the account information such as the customer's current and prior account status.

Moreover, such a secure connection may be used by the central system 163 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described elsewhere herein.

Automatic updates of a customer's SBG server may also be enabled. For example, central system 163 may notify a local SBG server regarding new products and/or product updates. For example, central system 163 may notify a local SBG server regarding updates of new gaming software, gaming software updates, peripheral updates, the status of current gaming software licenses, etc.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 163 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 163 and the gaming establishments.

Exemplary Licensing Management Methods and Devices

Some examples of license management according to the present invention will now be described. In these examples, the central licensing system will often be referred to as "IGT's License System" or the like. Similarly, the functionality provided by such a central system will often be described as provided by IGT, the present assignee. At the present time, IGT expects to be the provider of such services, data, related devices and software, etc. However, it will be appreciated that IGT may choose to license the rights to some "central system" aspects of the invention to other entities in the future.

Figure 2A:
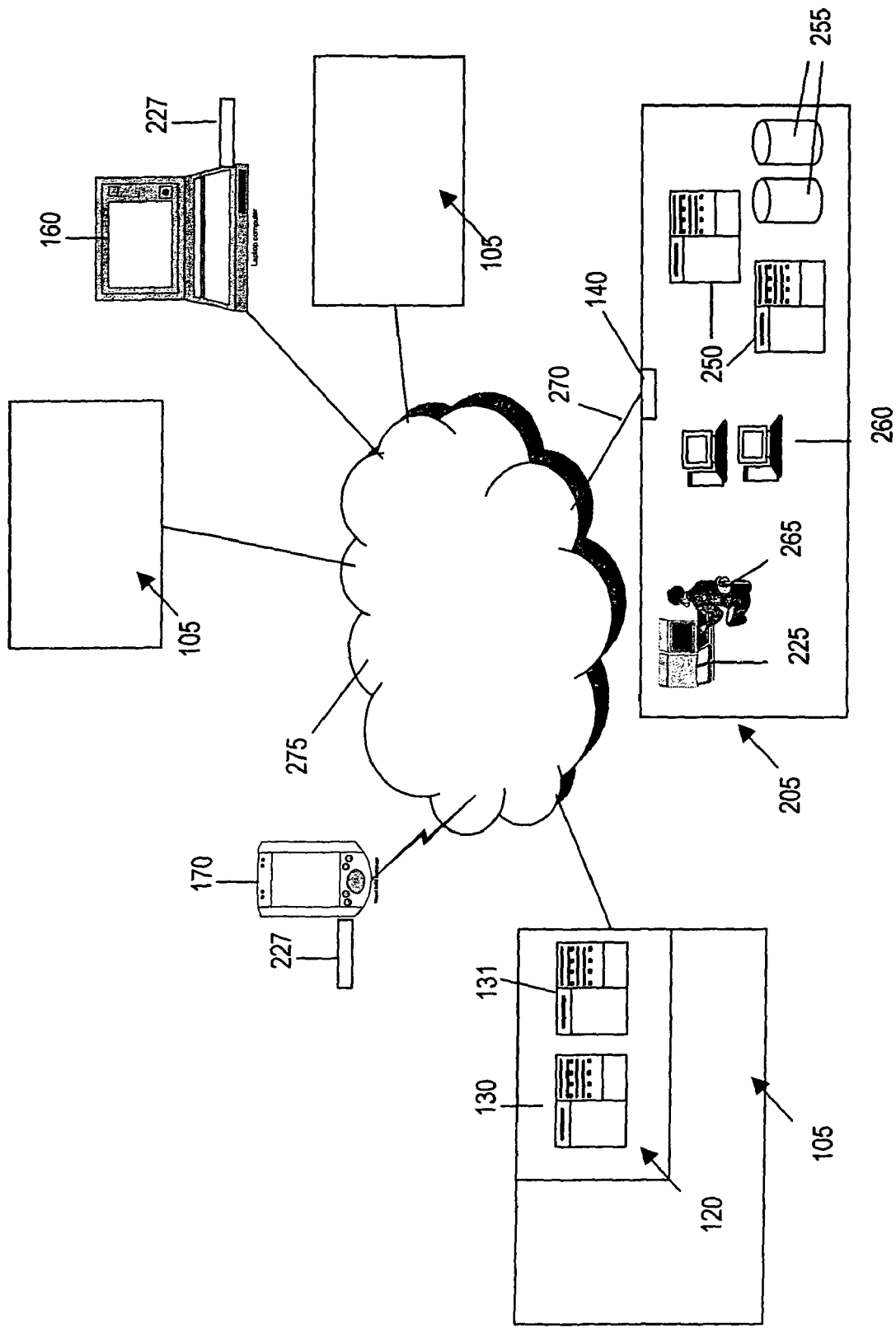
FIG. 2A is a network diagram that illustrates one implementation of the invention.

FIG. 2 is a block diagram that illustrates some components of a license management system and the interaction of such components according to one implementation of the invention. Central system 205 includes the necessary devices and personnel for implementing the relevant aspects of the invention described herein, some examples of which are described below with reference to FIG. 2A. FIG. 2 illustrates some components of central system 205 according to their functionality. Central system 205 could be, for example, part of central system 163 shown in FIG. 1.

License system 210 is configured to coordinate the various licensing-related tasks of central system 205 that are described in detail below. License system 210 controls the operation of authentication token configuration device(s) 225 and license generator 215. License system 210 may be implemented, for example, via specialized enterprise management software running on various network devices, host devices, etc. For example, license system 210 may be based upon software comparable to SAP Aktiengesellschaft's R/3 or Customer Relationship Management ("CRM") software.

According to some preferred implementations of the invention, devices 225 can prepare server authentication tokens 229. Such tokens may be, for example, personal USB authentication and encryption tokens that are known in the art as "iKeys." Accordingly, server authentication tokens 229 are also referred to herein as "Server iKeys" and the like.

Server authentication tokens 229 are security devices configured for attachment to a device that is running license management software for a customer (e.g., to License Manager 131). The customer receives one server authentication token 229 with License Manager 131. In some implementations, personnel associated with central system 205 plug server authentication token 229 into the device running License Manager 131 (which may be in the same rack with SBG server 130) during installation. License Manager 131 uses server authentication token 229 to authenticate the customer and the License Document 220 upon startup. License Manager 131 also uses server authentication token 229 to ensure that any licenses that the customer receives from License System 210 are indeed intended for the customer.

Devices 225 can preferably prepare license-ordering authentication tokens 227, also referred to herein as "Customer iKeys" and the like. A license-ordering authentication token 227 is configured for attachment to a device (e.g., to device 230) that is used to order licenses from central system 205. The device to which license-ordering authentication token 227 is attached may be, for example, comparable to one of devices 160 or 170 of FIG. 1. The customer receives one or more Customer iKeys from central system 205 when purchasing licenses. The customer may attach one of these Customer iKeys to a device used for ordering new licenses, changing licenses, and/or canceling licenses. For example, if a customer uses device 230 of FIG. 2 to order a license, the Customer iKey attached to device 230 would authenticate device 230 to License System 210.

License generator 215 includes software for preparing a license document 220, which includes a listing of licenses granted to a customer, related configuration parameters and other features necessary for the operation of license manager 131 that will be described below. In preferred implementations, all licenses and related configuration parameters for a customer's site are coalesced into a single XML document (file). The file may be named, for example, IGT-license-businesspartnerid.xml.

The software for implementing license generator 215 may be installed, for example, in a server, a host device or a similar device. In this example, license document 220 is embodied in digital medium 212 (e.g., an optical disk or the like) for delivery to a customer. However, in alternative implementations, license document 220 may be transferred to the customer via a network.

As will be discussed in detail below, license manager 131 controls the ability of gaming machines (sometimes referred to herein as electronic gaming machines or "EGMs") to execute licensed software, including but not limited to software for providing games of chance. According to the example illustrated in FIG. 2 and most other examples described herein, SBG server 130 is an intermediary for communications between license manager 131 and EGMs 237 and 239. However, in alternative implementations, license manager 131 may respond to challenges from EGMs, grant or deny EGMs' requests to run games, etc., without going through SBG server 130.

Referring now to FIG. 2A, central system 205 preferably includes servers 250, storage devices 255 and host devices 260. Various operators 265 may be available for, e.g., operating one or more of these devices, answering the telephone and operating one or more authentication token configuration devices 225.

Devices 225 may be used as workstations for providing the authentication tokens described herein. In preferred implementations, devices 225 do not actually manufacture the authentication tokens themselves, but instead prepare, initialize and register the tokens.

According to some preferred implementations of the invention, central system 205 prepares and initializes a server authentication token 229 as follows. First, an ID is read from server authentication token 229 and the ID is added to a database stored on any convenient memory of central system 205. A password is created on server authentication token 229 and the password is added to central system 205's database. A public/private key-pair (e.g., a DSA public/private key-pair) is created on server authentication token 229 and the public key is added to central system 205's database. The private key is kept secret and an obfuscated version of the private key is provided in License Manager 131. A password is also created for the server authentication token 229. A sequence number is set to 0 in a private memory area of server authentication token 229. The time on server authentication token 229 is set to current GMT time in server authentication token 229's private memory area.

Referring once again to FIG. 2, when License Manager 131 loads a new License Document 220, License Manager 131 verifies that the sequence number and time contained in the new License Document 220 are greater than that stored in the corresponding server authentication token 229. If so, License Manager 131 loads the new License Document 220 and saves its sequence number and time in server authentication token 229; otherwise, License Manager 131 does not load the document.

The process for preparing and initializing a license-ordering authentication token 227 can be much simpler. In some implementations of the invention, the process involves only reading an ID from each license-ordering authentication token 227 and adding the ID to central system 205's database.

Preferably, EGM software is also processed by central system 205. In preferred implementations, a public key is embedded in the EGM software by central system 205. The EGM software provided to customers preferably allows a customer's EGMs to make challenge requests and evaluate responses to challenge requests, as described in more detail elsewhere herein.

Moreover, central system 205 creates a Server iKey Certificate that contains the Server iKey's public key. Central system 205 signs the certificate with the private key. As described in more detail below, the certificate will permit an EGM to receive and authenticate a Server iKey's public key. In an alternate implementation, the contents of the Server iKey Certificate can be stored in the License Document instead of the certificate. This implementation eliminates the need for a separate certificate file. The certificate's contents are the Server iKey's public key and the IGT-generated signature of this public key.

In addition, central system 205 encrypts the Server iKey's password using the symmetric key and stores the password in the customer's License Document. As described below, this will permit License Manager 131 to retrieve and decrypt the password.

Central system 205 uses its private key to sign the customer's License Document 220. Later, this will permit License Manager 131 to authenticate License Document 220.

Central system 205's public key, the physical Server iKey 229, the Server iKey Certificate, License Document 220, and hardware/software implementing License Manager 131 are delivered to the customer. Preferably, authorized personnel associated with central system 205 (e.g., IGT personnel) install License Manager 131, attaching the Server iKey to the computer running the License Manager software during installation. Central system 205's public key is preferably shipped to the customer in the EGM's firmware as well as the License Manager's software rather than in a separate file.

In the example of FIG. 2A, central system 205 is configured for communication with various gaming establishments 105 via network 275. Central system 205 is configured for communication with host devices 160 and 170, each of which has an attached license-ordering authentication token 227. According to some implementations of the invention, a customer could order new licenses, etc., via host device 160 or 170 even when these devices are not communicating from within a known gaming establishment 105.

Link 270 should have ample bandwidth and may, for example, comprise one or more T1 or T3 connections and/or satellite links having comparable bandwidth, etc. Network 275 is the Internet in this example. However, it will be understood by those of skill in the art that network 275 could include any one of various types of networks, such as the public switched telephone network ("PSTN"), a satellite network, a wireless network, a metro optical transport, etc. Accordingly, a variety of protocols may be used for communication on network 275, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

Turning now to FIG. 3, an overview of license manager runtime operations will now be described. According to preferred implementations of the invention, more features than described above are provided in license document 220. In one such exemplary implementation, license document 220 includes the following: licenses granted to a customer (preferably visible as plaintext); Server iKey ID (preferably visible as plaintext); an encrypted Server iKey Password; a Standalone Grace Period for each license; an Update Period; an Expiration Date; a Pre-expiration Warning Time; and a signature.

The Server iKey Password is used to access the private memory area of the Server iKey. The password is encrypted using a key (e.g., a symmetric key) known only to the central system and the License Manager.

For each license, the Standalone Grace Period specifies how long an EGM can run a game (also referred to herein as a "theme") without receiving further permission to do so. As noted elsewhere herein, in preferred implementations of the invention such permission is received from SBG Server 130 according to instructions from License Manager 131. The Standalone Grace Period may be defined in any convenient units of time, e.g., in minutes. A Standalone Grace Period of zero means that the EGM cannot run the theme. In some implementations, a Standalone Grace Period of −1 means that the EGM can run the theme forever.

In some implementations, the Update Period is used as follows. License Manager 131 periodically requests SBG Server 130 to reset an EGM's Standalone Grace Period, thereby giving or denying the EGM permission to continue to use a license. If permission is granted, SBG Server 130 sends a configuration message to the EGM specifying a non-zero Standalone Grace Period and the EGM resets its grace-period timer accordingly. However, if permission is denied, SBG Server 130 sends a configuration message to the EGM specifying a zero Standalone Grace Period. The EGM stops running the theme and notifies SBG Server 130 that the EGM has stopped running the theme.

In addition to the expiration periods of the licenses contained in License Document 220, License Document 220 itself has an expiration date that supersedes all licenses in License Document 220. If License Document 220 expires but contains licenses that haven't expired, a new License Document 220 will be sent to a customer upon request. This arrangement provides central system 205 an opportunity to verify the integrity of all licenses in License Document 220 and detect the presence of an incorrect license (e.g., the presence of a non-expiring license to a theme that the customer never ordered) before delivering the new License Document 220. The Pre-expiration Warning Time indicates when to warn the user that a license is about to expire.

All of these elements are collectively signed by central system 205 (e.g., by license generator 215). The signature is included in License Document 220.

Referring again to the exemplary runtime flow depicted in FIG. 3, each EGM 310 and License Manager 131 perform the following operations while running at the customer's site. When License Manager 131 runs, it first verifies that License Document 220 was signed by central system 205. License Manager 131 checks the signature using the public key that is embedded in License Manager 131. After License Manager 131 verifies License Document 220's signature, License Manager 131 knows it can trust License Document 220. Then, License Manager 131 obtains the Server iKey's encrypted password 315 from the customer's License Document 220 and decrypts the password with the embedded, obfuscated symmetric key 320. Each EGM 310 first establishes a secure communications connection e.g., a SuperSAS or BOB communications connection) to License Manager 131. All subsequent communications should take place via this connection. In preferred implementations, if any part of the following fails, the EGM must drop the connection and try again.

Each EGM 310 then ensures that it receives the Server iKey Certificate 305 and verifies that the certificate was signed by central system 205 via the embedded IGT public key. Instead of sending the certificate, the License Manager can send the Server iKey's public key and its signature.

Each EGM then sends a challenge request 325 to License Manager 131. Challenge request 325 preferably contains something that is unique to that request in order to prevent replay attacks. The request may contain, for example, random numbers, sequence numbers, timestamps and/or combinations of these. License Manager 131 signs the challenge request 325's data using Server iKey 229 and returns the signature 330 to the EGM 310 as a challenge response 335. The EGM 310 verifies the authenticity of the response via Server iKey Certificate 305. Because only License Manager 131 has the password used to access Server iKey 229, only a License Manager 131 having the correct Server iKey 229 can sign the challenge request 330 and produce a challenge response 335 that will be accepted by EGM 310.

Referring now to FIG. 4, an exemplary enrollment method 400 will be described. It will be appreciated that the steps of the methods described herein, including method 400, do not always need to be performed in the order indicated. In step 405, central system 205 initializes and registers a Server iKey 229 for the customer. Central system 205 registers one or more Customer iKeys 227 for the customer (step 410). Central system 205 adds the customer to its database. (Step 415.)

Central system 205 then prepares an initial License Document 220 that contains the Server iKey ID and encrypted Server iKey password 315 (step 420) and delivers this License Document 220 with the customer's License Manager 131. (Step 425.)

The SBG system, including License Manager 131 and the initial License Document 220, is installed and activated at the customer's site. (Step 430.) When started, License Manager 131 first verifies that License Document 220 was signed by central system 205. (Step 432.) License Manager 131 checks the signature using the public key that is embedded in License Manager 131. After License Manager 131 verifies License Document 220's signature, License Manager 131 knows it can trust License Document 220. Then, License Manager 131 verifies that it is authorized to run by matching its Server iKey ID with the corresponding signed Server iKey ID located in the License Document 220. (Step 435.)

A process of ordering subsequent licenses will now be described with reference to FIG. 5. In method 500, License Documents 220 are shipped on a tangible medium (e.g., on an optical disk) to customer. In alternative implementations, License Documents 220 may be downloaded by a customer via a computer network.

In step 505, a customer orders new licenses. In this example, the customer orders the licenses using browser software installed on PDA 170, to which a Customer iKey 227 is attached. (See FIG. 2A.) Central system 205 prepares the requested licenses and stores them in a License Document 220, which is a single, signed, XML document in this example. (Step 510.)

Central system 205 copies the License Document 220 to a digital medium (step 515) and sends the digital medium to customer (step 520). The digital medium can be any device (including but not limited to a CD, a DVD or a USB "drive") that presents itself to an operating system (e.g., to MS Windows) as a file system when installed.

In step 525, the customer receives the digital medium and installs it. During installation, License Manager 131 loads License Document 220, reads licenses from License Document 220 and verifies the licenses' authenticity and integrity by checking the signature on the License Document. (Step 530.) Moreover, License Manager 131 verifies that the licenses were intended for use by this customer by matching the Server iKey's ID with that provided in the new License Document 220.

In step 535, the customer sends license-usage summary (electronically or on digital media) to License System 210 after the new licenses are loaded and periodically thereafter. This allows License System 210 to verify that the customer installed the new license (overwriting the previous license). It also allows License System 210 to track the customer's license usage. The summary is signed by the License Manager using the Server iKey's private key before delivery to License System 210 and verified at central system 205 via the corresponding public key. If the license-usage information is not sent to central system 205 within some time period, then central system 205 could prohibit future license purchases.

If an EGM had a license that expired and a newly installed license would allow the EGM to run the corresponding theme again, License Manager 131 notifies SBG Server 130 that the EGM has permission to run the corresponding theme again. SBG Server 130 then updates the EGM's configuration accordingly and the EGM runs the game.

In step 540, License Manager 131 informs SBG Server 130 that the current state of license usage has changed. SBG Server 130 can ask the License Manager 131 for the current license usage for display, e.g. via SBG Management Console 235 of FIG. 2, device 160 and/or 170 of FIG. 1 or 2A, etc.

Figure 6:
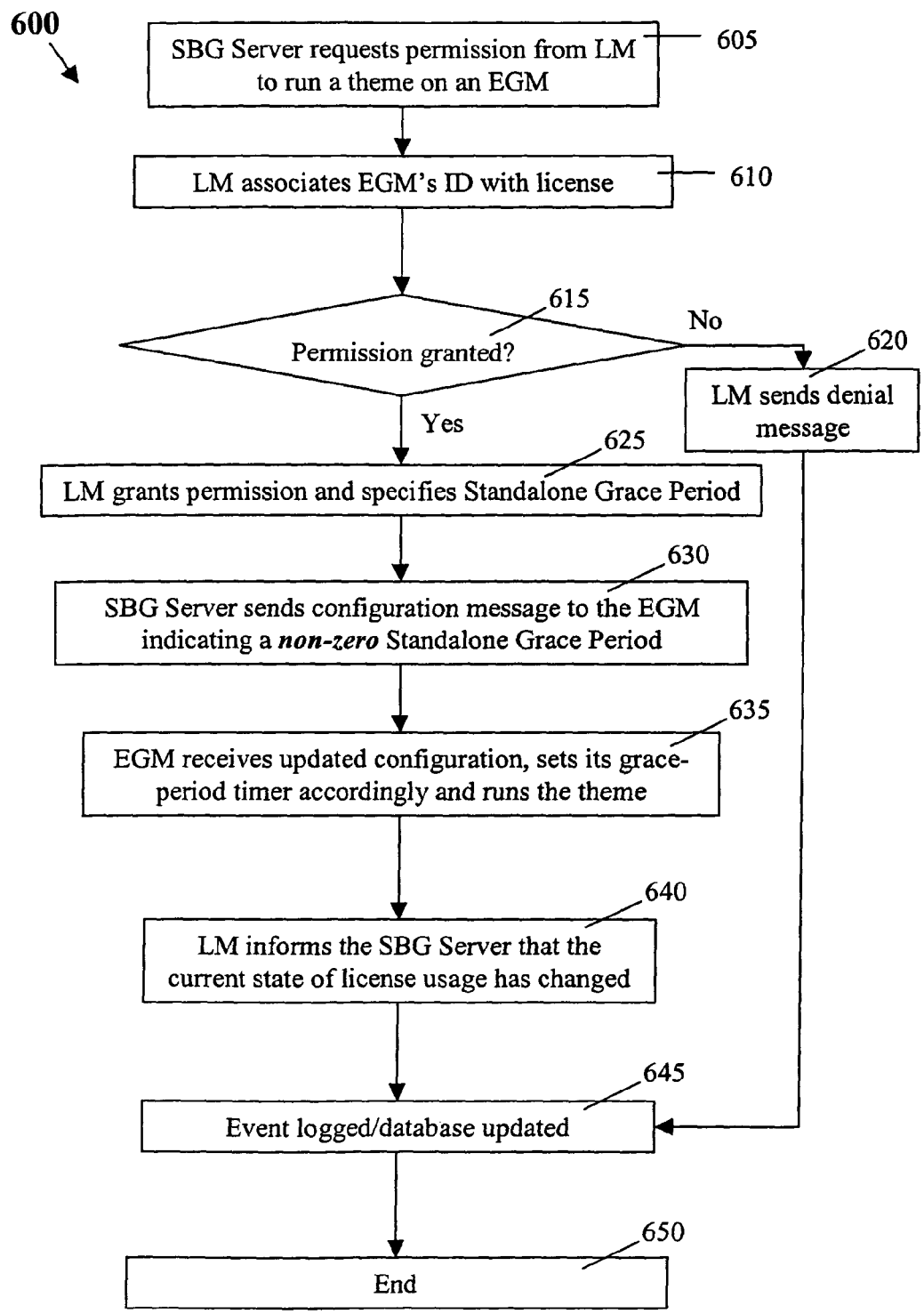
FIG. 6 is a flow chart that outlines a method according to some aspects of the invention.

Method 600 of obtaining permission to run a theme on an EGM will now be described with reference to FIG. 6. In step 605, SBG Server 130 requests permission from License Manager 131 to run a theme on an EGM. License Manager 131 associates the EGM's ID (for example, the EGM's customer asset # and serial #) with the license. (Step 610.)

In step 615, License Manager 131 determines whether to grant permission to run the theme. In this example, if License Manager 131 determines that a corresponding license is available and has not expired, License Manager 131 grants permission to SBG Server 130 to run the theme. (Step 625.) License Manager 131 also specifies a Standalone Grace Period that tells the EGM how long it can run the theme without receiving further permission to do so (in this example, from SBG Server 130).

SBG Server 130 then sends a configuration message to the EGM specifying a non-zero Standalone Grace Period (step 630). The EGM receives the updated configuration, sets its grace-period timer accordingly, and runs the theme. (Step 635.) License Manager 131 informs SBG Server 130 that the current state of license usage has changed. (Step 640.)

If License Manager 131 determines that a corresponding license is not available or is expired, License Manager 131 sends a "permission denied" message to SBG Server 130. (Step 620.) In step 645, the event is logged and central system 205's database is updated.

In some implementations of the invention, when a customer wants an EGM to stop running a theme, SBG Server 130 updates the EGM's configuration specifying a zero Standalone Grace Period. The EGM receives the updated configuration, zeroes its grace-period timer, stops running the theme and notifies SBG Server 130 that it has stopped running the theme. SBG Server 130 requests permission from License Manager 131 to stop the theme on the EGM and License Manager 131 disassociates the EGM from the license. License Manager 131 then informs the SBG Server that the current state of license usage has changed.

Figure 7:
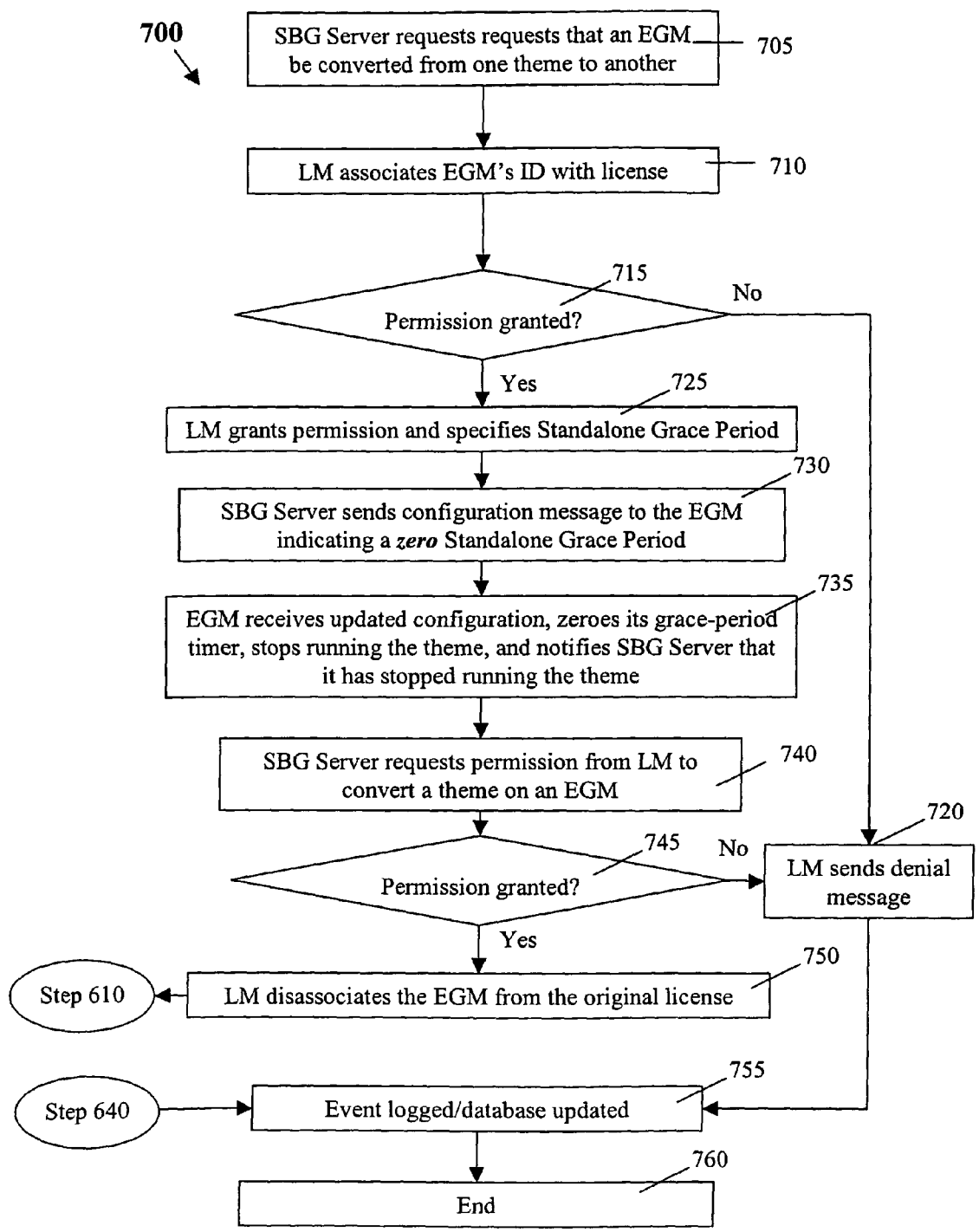
FIG. 7 is a flow chart that outlines a method according to some aspects of the invention.

One method 700 of requesting permission for an EGM to be converted from running one them to another them will now be described with reference to FIG. 7. In step 705, a customer requests (e.g., by controlling SBG management console 235) that an EGM be converted from one theme to another. License Manager 131 associates the EGM's ID with the license. (Step 710.) If the requested license is available and has not expired, License Manager 131 grants permission and specifies a zero Standalone Grace Period. (Step 725.) (Otherwise, License Manager 131 sends a denial message to SBG server 130.) (Step 720.)

In step 730, SBG Server 130 updates the EGM's configuration specifying a zero Standalone Grace Period. The EGM receives the updated configuration, zeroes its grace-period timer, stops running the theme, and notifies SBG Server 130 that the EGM has stopped running the theme. (Step 735.)

SBG Server 130 then requests permission from License Manager 131 to convert a theme on an EGM. (Step 740.) If permission is granted, License Manager 131 disassociates the EGM from the original license. (Step 750.) The process then follows steps 610 through 640 of method 600. In step 755, the event is logged and/or database updated.

License Manager 131 periodically requests SBG Server 130 to reset an EGM's Standalone Grace Period, thereby giving/denying the EGM permission to continue to use a license. This ensures that License Manager 131 can determine when a license expires based on a clock of License Manager 131, rather than an EGM's clock that may be easier to cheat.

Figure 8:
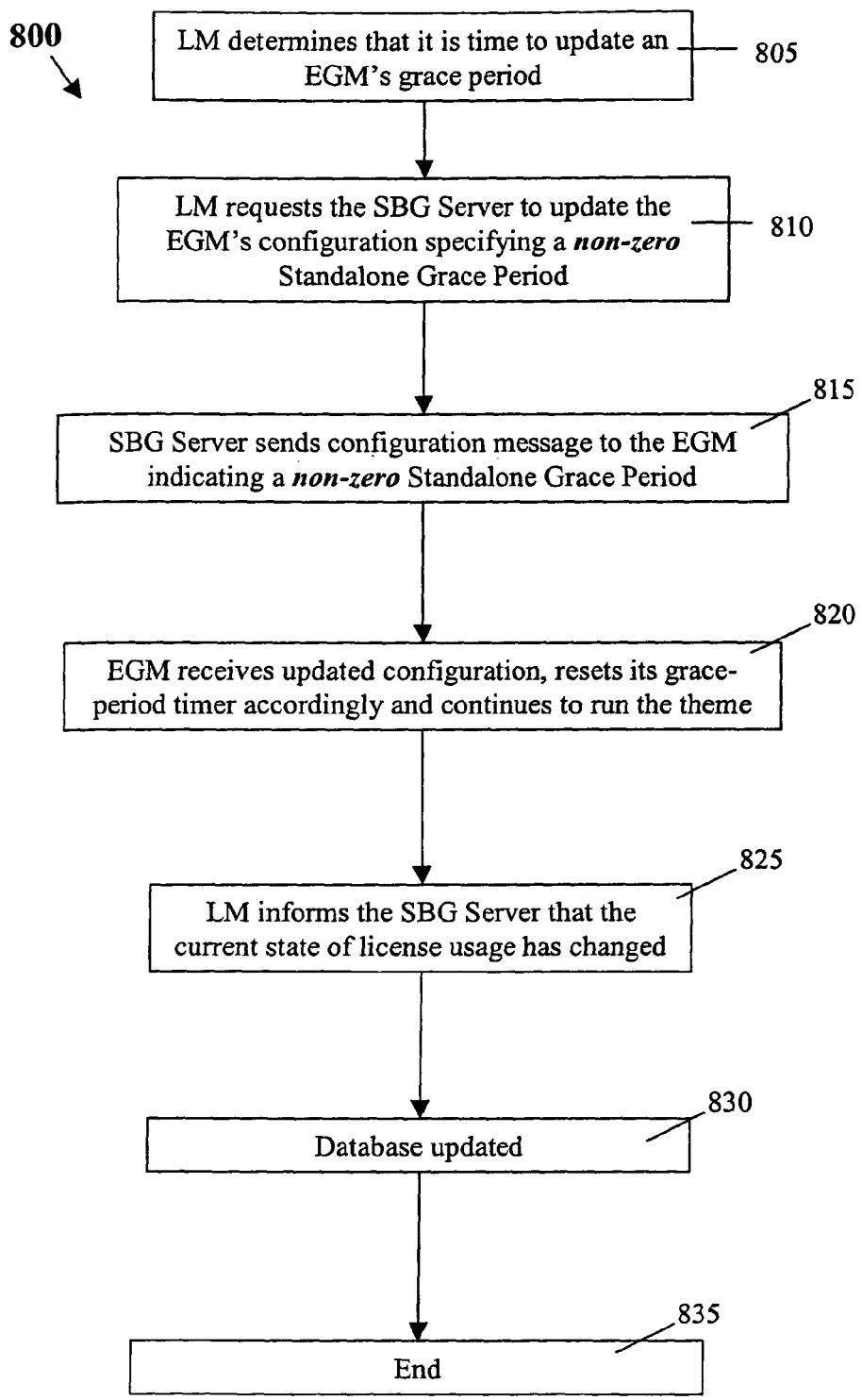
FIG. 8 is a flow chart that outlines a method according to some aspects of the invention.

One exemplary method 800 will now be described with reference to FIG. 8. In this example, the relevant license has not expired. In step 805, License Manager 131 determines that it is time to update an EGM's grace period. License Manager 131 requests SBG Server 130 to update the EGM's configuration specifying a non-zero Standalone Grace Period (step 810) and SBG Server 130 does so (step 815).

In step 820, the EGM receives the updated configuration, resets its grace-period timer accordingly and continues to run the theme. License Manager 131 informs SBG Server 130 that the current state of license usage has changed (step 825) and the relevant database is updated (step 830).

If the relevant license has expired when License Manager 131 determines that it is time to update an EGM's grace period, License Manager 131 will disassociate the EGM from the license and instruct SBG Server 130 to update the EGM's configuration specifying a zero Standalone Grace Period.

If an EGM is running a theme but does not receive further permission to do so from SBG Server 130 within the Standalone Grace Period, the EGM will continue to run the theme until the Standalone Grace Period expires. Upon expiration, the EGM will stop running the theme and will notify SBG Server 130 that the EGM has stopped running the theme.

Figure 9:
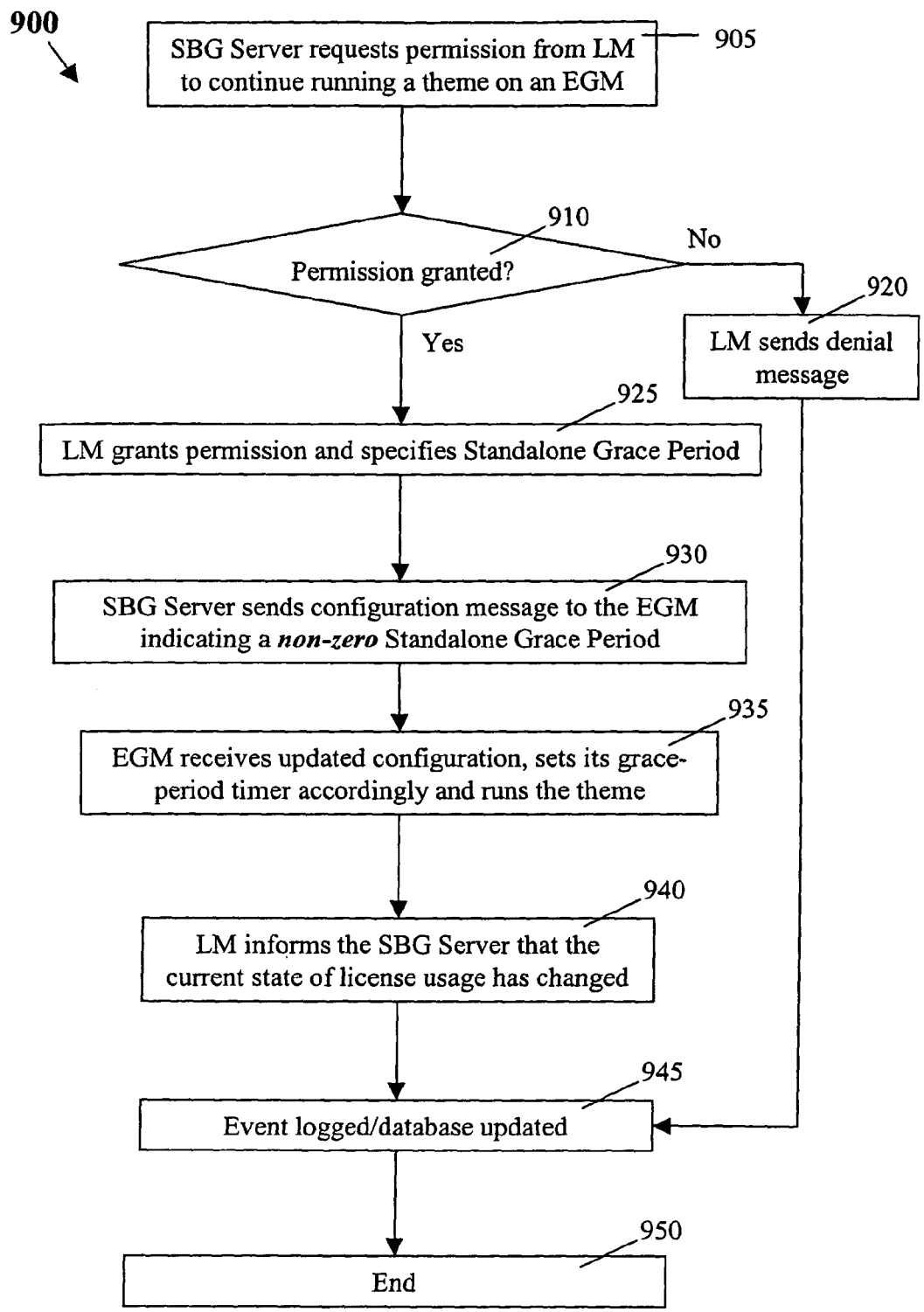
FIG. 9 is a flow chart that outlines a method according to some aspects of the invention.

A customer may desire that some aspect of a theme be changed (e.g., pay table or denomination) on an EGM and that the EGM still be able to run the current theme. Flow chart 900 of FIG. 9 outlines one method of continuing permission according to the present invention.

In step 905, a customer requests permission (via SBG server 130) to continue running a theme on an EGM, but to change some aspect of the theme. If a current license is available and has not expired, License Manager 131 grants permission to SBG Server 130 to run the theme and specifies a non-zero Standalone Grace Period. (Step 925.) SBG Server 130 sends a configuration message to the EGM specifying a non-zero Standalone Grace Period. (Step 930.) The EGM receives updated configuration, sets its grace-period timer accordingly and runs the theme. (Step 935.) License Manager 131 informs SBG Server 130 that the current state of license usage has changed. (Step 940.)

If a current license is not available or has expired, License Manager 131 sends a "permission denied" message to SBG server 130. (Step 920.) The event is logged and/or database updated in step 945.

Figure 10:
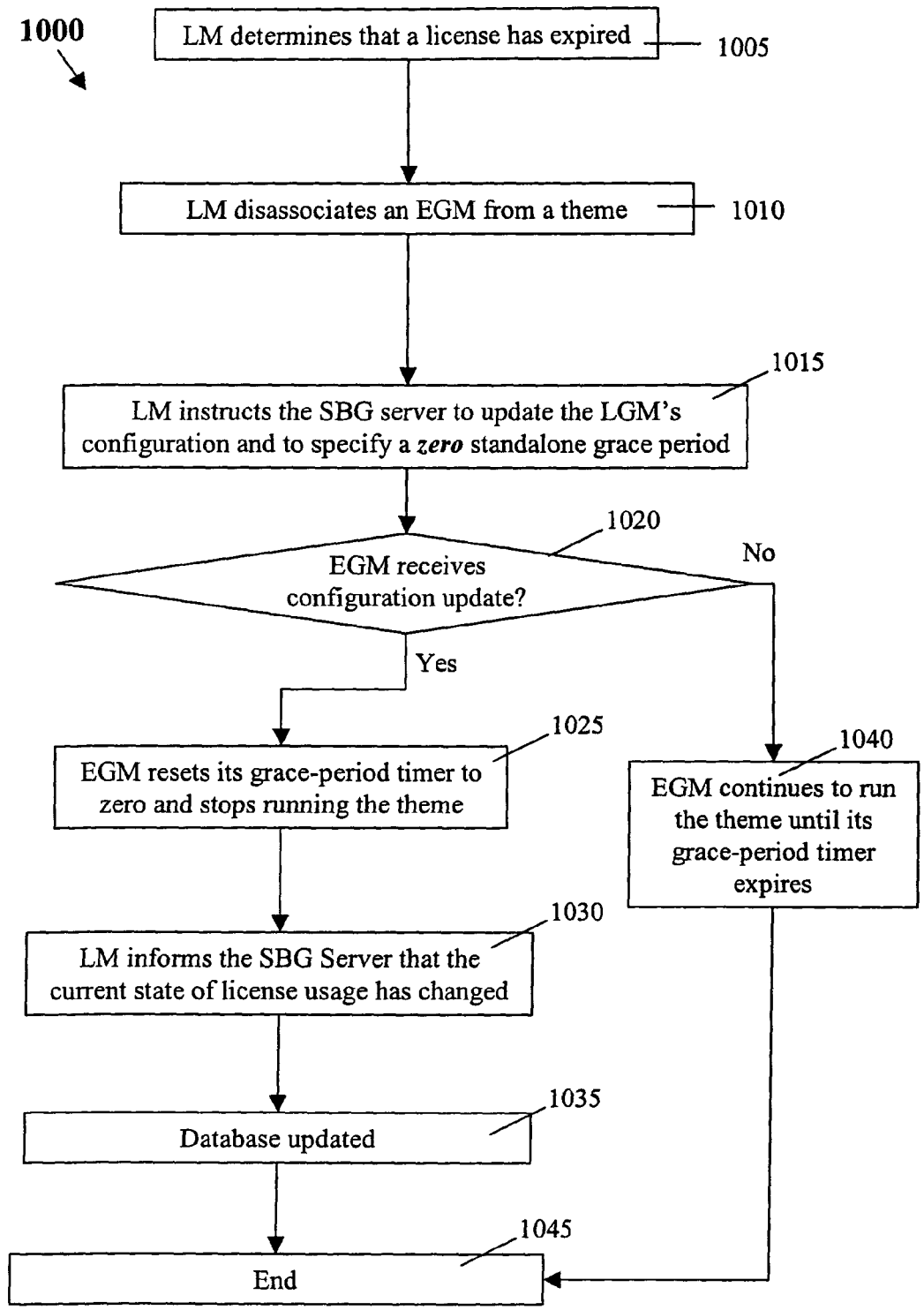
FIG. 10 is a flow chart that outlines a method according to some aspects of the invention.

FIG. 10 outlines exemplary method 1000 of responding to a situation wherein a license being used by one or more EGMs expires. In step 1005, License Manager 131 determines that a license has expired and, in response, disassociates the EGM from the theme (step 1010). In step 1015, License Manager 131 instructs SBG server 130 to update the EGM's configuration specifying a zero Standalone Grace Period. If the EGM receives the updated configuration, the EGM zeroes its grace-period timer, stops running the theme, and notifies SBG Server that it has stopped running the theme. (Step 1025.) License Manager 131 informs SBG Server 130 that the current state of license usage has changed (step 1030) and the database is updated (1035). If the EGM does not receive the updated configuration, the EGM continues to run the theme until the EGM's grace-period timer expires. (Step 1040.) Upon expiration, the EGM stops running the theme and preferably notifies SBG Server that it has stopped running the theme.

Figure 11:
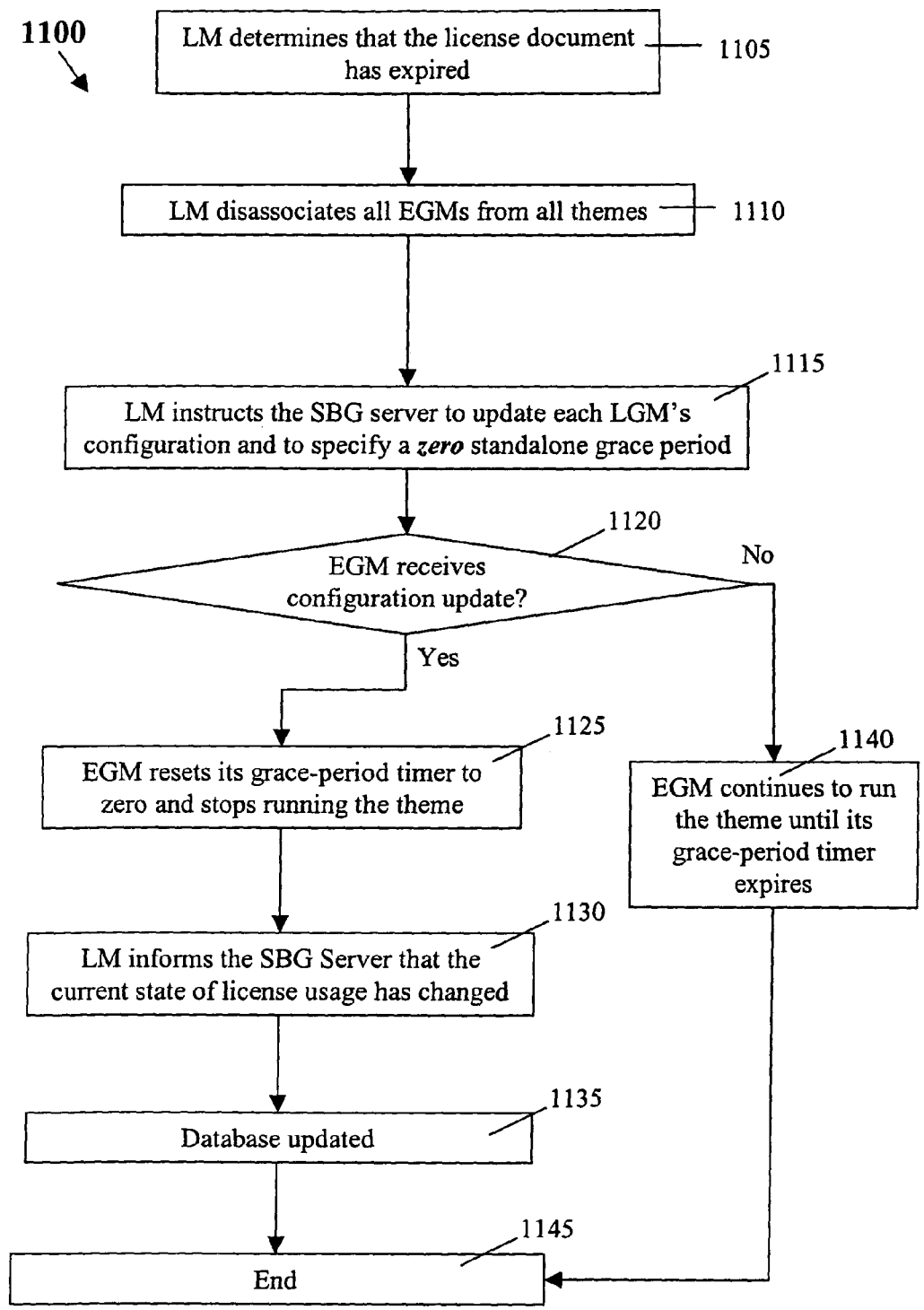
FIG. 11 is a flow chart that outlines a method according to some aspects of the invention.

When a License Document is about to expire, License Manager 131 preferably requests the SBG Server to notify the customer that the License Document is about to expire. Some aspects of the invention provide method 1100, outlined in FIG. 11, for responding to the expiration of a License Document. In step 1105, License Manager 131 determines that the License Document has expired. License Manager 131 disassociates all EGMs from all themes (step 1110) and instructs SBG server 130 to update each EGM's configuration specifying a zero Standalone Grace Period (step 1115). If an EGM receives the updated configuration, the EGM zeroes its grace-period timer, stops running the theme and notifies SBG Server 130 that the EGM has stopped running the theme. (Step 1125.) License Manager 131 informs SBG Server 130 that the current state of license usage has changed. (Step 1130.)

If an EGM does not receive the updated configuration, the EGM continues to run the theme until the Standalone Grace Period expires, according to the EGM's grace-period timer. (Step 1140.) Upon expiration, the EGM stops running the theme and preferably notifies SBG Server that it has stopped running the theme.

Gaming Machine

Figure 12:
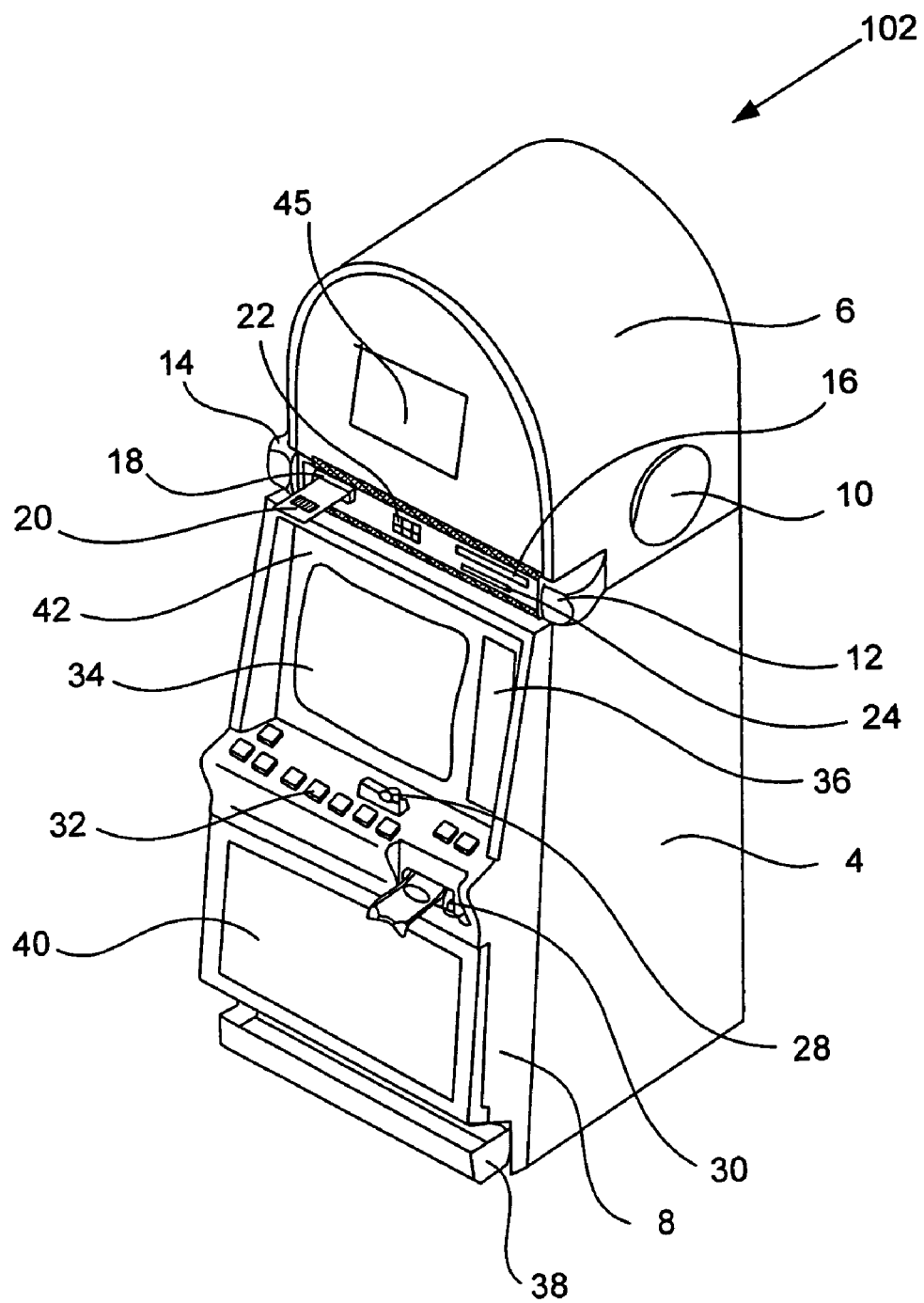
FIG. 12 illustrates a gaming machine that may be configured according to some aspects of the invention.

Turning next to FIG. 12, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 12, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 13:
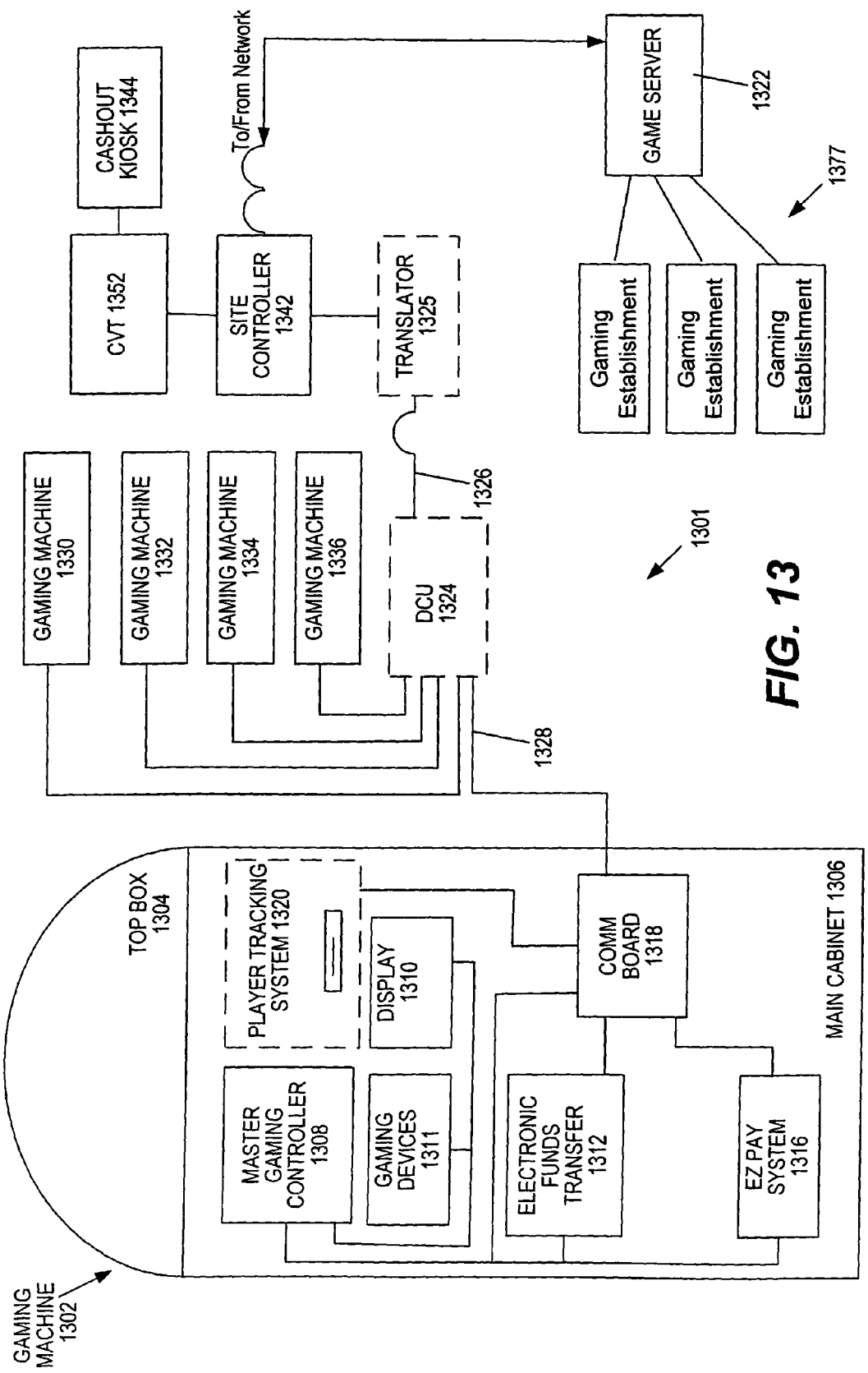
FIG. 13 illustrates a gaming machine and a gaming network that may be configured according to some aspects of the invention.

A gaming network that may be used to implement additional methods performed in accordance with embodiments of the invention is depicted in FIG. 13. Gaming establishment 1301 could be any sort of gaming establishment, such as a casino, a card room, an airport, a store, etc. In this example, gaming network 1377 includes more than one gaming establishment, all of which are networked to game server 1322.

Here, gaming machine 1302, and the other gaming machines 1330, 1332, 1334, and 1336, include a main cabinet 1306 and a top box 1304. The main cabinet 1306 houses the main gaming elements and can also house peripheral systems, such as those that utilize dedicated gaming networks. The top box 1304 may also be used to house these peripheral systems.

The master gaming controller 1308 controls the game play on the gaming machine 1302 according to instructions and/or game data from game server 1322 or stored within gaming machine 1302 and receives or sends data to various input/output devices 1311 on the gaming machine 1302. In one embodiment, master gaming controller 1308 includes processor(s) and other apparatus of the gaming machines described above in FIGS. 6 and 7. The master gaming controller 1308 may also communicate with a display 1310.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1308 may also communicate with EFT system 1312, EZPay™ system 1316 (a proprietary cashless ticketing system of the present assignee), and player tracking system 1320. The systems of the gaming machine 1302 communicate the data onto the network 1322 via a communication board 1318.

It will be appreciated by those of skill in the art that embodiments of the present invention could be implemented on a network with more or fewer elements than are depicted in FIG. 13. For example, player tracking system 1320 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1324 and translator 1325 are not required for all gaming establishments 1301. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1342 provides this function for gaming establishment 1301. Site controller 1342 is connected to a central system and/or other gaming establishments via one or more networks, which may be public or private networks. Among other things, site controller 1342 communicates with game server 1322 to obtain game data, such as ball drop data, bingo card data, etc.

In the present illustration, gaming machines 1302, 1330, 1332, 1334 and 1336 are connected to a dedicated gaming network 1322. In general, the DCU 1324 functions as an intermediary between the different gaming machines on the network 1322 and the site controller 1342. In general, the DCU 1324 receives data transmitted from the gaming machines and sends the data to the site controller 1342 over a transmission path 1326. In some instances, when the hardware interface used by the gaming machine is not compatible with site controller 1342, a translator 1325 may be used to convert serial data from the DCU 1324 to a format accepted by site controller 1342. The translator may provide this conversion service to a plurality of DCUs.

Further, in some dedicated gaming networks, the DCU 1324 can receive data transmitted from site controller 1342 for communication to the gaming machines on the gaming network. The received data may be, for example, communicated synchronously to the gaming machines on the gaming network.

Here, CVT 1352 provides cashless and cashout gaming services to the gaming machines in gaming establishment 1301. Broadly speaking, CVT 1352 authorizes and validates cashless gaming machine instruments (also referred to herein as "tickets" or "vouchers"), including but not limited to tickets for causing a gaming machine to display a game result and cash-out tickets. Moreover, CVT 1352 authorizes the exchange of a cashout ticket for cash. These processes will be described in detail below. In one example, when a player attempts to redeem a cash-out ticket for cash at cashout kiosk 1344, cash out kiosk 1344 reads validation data from the cashout ticket and transmits the validation data to CVT 1352 for validation. The tickets may be printed by gaming machines, by cashout kiosk 1344, by a stand-alone printer, by CVT 1352, etc. Some gaming establishments will not have a cashout kiosk 1344. Instead, a cashout ticket could be redeemed for cash by a cashier (e.g. of a convenience store), by a gaming machine or by a specially configured CVT.

Some methods of the invention combine information that can be obtained from game network accounting systems with features described above. By combining, for example, information regarding scheduled gaming machine configurations and information regarding the amount of money that a gaming machine brings in while a gaming machine has a particular configuration, gaming machine configurations may be optimized to maximize revenue. Some such methods involve determining a first rate of revenue obtained by a gaming machine in the gaming network during a first time when the gaming machine has a first configuration. The gaming machine is later automatically configured according to second configuration information supplied by the SBG server, e.g., as scheduled by the Scheduler. A second rate of revenue, obtained by the gaming machine during a second time when the gaming machine has the second configuration, is determined, and so on.

After scheduling various configurations at various times, optimum configurations for the gaming machine may be determined for various times of day. The SBG system can them provide scheduled optimal configurations for the gaming machine at the corresponding times of day. Some implementations provide for groups (e.g., banks) of gaming machines to be automatically configured according to a predetermined schedule of optimal configurations for various times of day, days of the week, times of the year, etc.

In some such implementations, an average revenue may be computed, based on revenue from many gaming machines having the same configuration at the same time of day. These average revenues could be used to determine an overall optimal value for relevant time periods.

Figure 14:
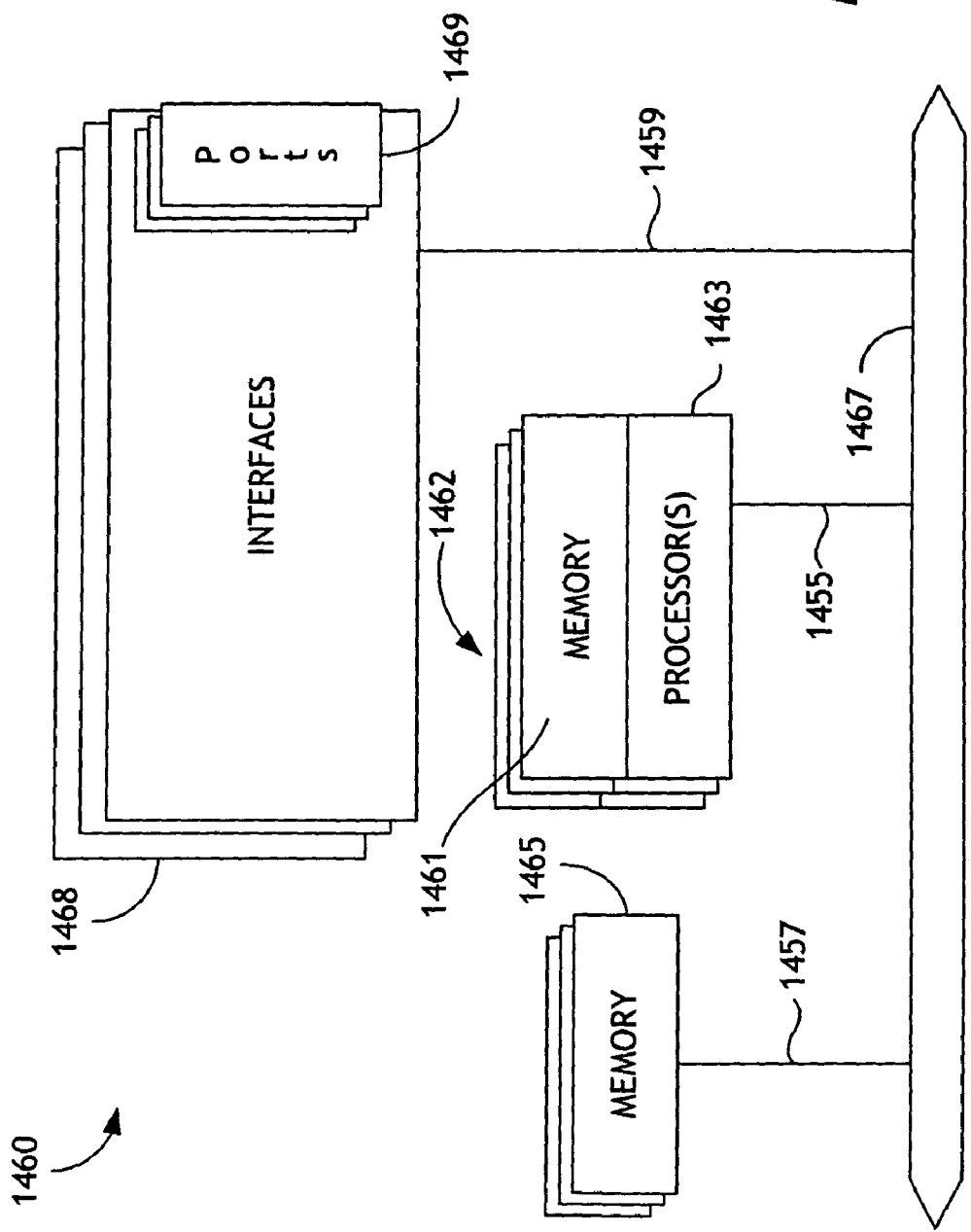
FIG. 14 illustrates a network device that may be configured according to some aspects of the invention.

FIG. 14 illustrates an example of a network device that may be configured for implementing some methods of the present invention. Network device 1460 includes a master central processing unit (CPU) 1462, interfaces 1468, and a bus 1467 (e.g., a PCI bus). Generally, interfaces 1468 include ports 1469 appropriate for communication with the appropriate media. In some embodiments, one or more of interfaces 1468 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1468 control such communications-intensive tasks as encryption, decryption, compression, decompression, packetization, media control and management. By providing separate processors for the communications-intensive tasks, interfaces 1468 allow the master microprocessor 1462 efficiently to perform other functions such as routing computations, network diagnostics, security functions, etc.

The interfaces 1468 are typically provided as interface cards (sometimes referred to as "linecards"). Generally, interfaces 1468 control the sending and receiving of data packets over the network and sometimes support other peripherals used with the network device 1460. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1462 may be responsible for implementing specific functions associated with the functions of a desired network device. According to some embodiments, CPU 1462 accomplishes all these functions under the control of software including an operating system and any appropriate applications software.

CPU 1462 may include one or more processors 1463 such as a processor from the Motorola family of microprocessors or the MIPS family of microprocessors. In an alternative embodiment, processor 1463 is specially designed hardware for controlling the operations of network device 1460. In a specific embodiment, a memory 1461 (such as non-volatile RAM and/or ROM) also forms part of CPU 1462. However, there are many different ways in which memory could be coupled to the system. Memory block 1461 may be used for a variety of purposes such as, for example, caching and/or storing data, programming instructions, etc.

Regardless of network device's configuration, it may employ one or more memories or memory modules (such as, for example, memory block 1465) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 14 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 14) or switch fabric based (such as a cross-bar).

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

We claim:

1. A licensing management method for gaming, the method comprising:
   receiving, at a license manager device, a request for a first permission to execute a game of chance on a gaming machine;
   determining, by the license manager device, that a corresponding license for the game of chance is available and not expired;
   granting, responsive to determining that the corresponding license is available and not expired, the first permission to execute the game of chance; and
   specifying, in conjunction with the granting the first permission to execute the game of chance, a standalone grace period which represents a period of time during which the first permission is in force and during which a gaming machine may be configured to execute the game of chance without receiving a second permission to execute the game of chance, wherein the standalone grace period is of a shorter duration than the corresponding license.

2. The method of claim 1, further comprising sending a configuration message to the gaming machine specifying the standalone grace period, the configuration message comprising information to enable the gaming machine to be configured to execute the game of chance.

3. The method of claim 2, further comprising setting a standalone grace period timer of the gaming machine.

4. The method of claim 1, wherein the request is received from a gaming management server.

5. The method of claim 4, further comprising informing the gaming management server of a new state of license usage.

6. The method of claim 1, wherein the request and the first permission pertain to a specific gaming machine, further comprising associating the specific gaming machine with the corresponding license.

7. A non-transitory, machine-readable medium having licensing management software stored thereon, the licensing management software comprising instructions for controlling a least one device in a gaming network to do the following:
   receive a request for a first permission to execute a game of chance on a gaming machine;
   determine that a corresponding license for the game of chance is available and not expired;
   grant, responsive to the determination that the corresponding license is available and not expired, the first permission to execute the game of chance when the corresponding license is available and not expired; and
   specify, in conjuction with the grant of the first permission to execute the game of chance, a standalone grace period which represents a period of time during which the first permission is in force and during which a gaming machine may be configured to execute the game of chance without receiving a second permission to execute the game of chance, the standalone grace period of a shorter duration than the corresponding license.

8. The machine-readable medium of claim 7, wherein the licensing management software further comprises instructions for authorizing a least one device in a gaming network to send a configuration message to the gaming machine specifying the standalone grace period, the configuration message comprising information to enable the gaming machine to be configured to execute the game of chance.

9. The machine-readable medium of claim 7, wherein the request and the first permission pertain to a specific gaming machine, further comprising instructions for controlling a least one device in a gaming network to associate the specific gaming machine with the corresponding license.

10. A licensing management device for gaming, the device comprising:
    an interface configured for receiving a request for a first permission to execute a game of chance on a gaming machine; and
    at least one processor configured for:
       determining whether a corresponding license is available and not expired;
       associating the gaming machine with the corresponding license;
       granting permission to execute the game of chance when a corresponding license is available and not expired; and
       specifying a standalone grace period during which the gaming machine may be configured to execute the game of chance without receiving a second permission to execute the game of chance, the standalone grace period of a shorter duration than the corresponding license.

11. The license management device of claim 10, wherein the license management device comprises a server.

* * * * *